United States Patent
Chou

(10) Patent No.: US 6,739,073 B2
(45) Date of Patent: May 25, 2004

(54) METHOD AND APPARATUS FOR PERFORMING MULTIPLE CLEANING AND VACUUM DRYING OPERATIONS IN ENCLOSED VESSELS

(76) Inventor: Cheng-Ming Chou, 10/F-3, No. 8 Lane 226, Jen-ai Rd., Lin 16, Nanshih Vill., Linkou Hsiang, Taipei (TW)

( * ) Notice: Subject to any disclaimer, the term of this patent is extended or adjusted under 35 U.S.C. 154(b) by 0 days.

(21) Appl. No.: 10/206,099

(22) Filed: Jul. 29, 2002

(65) Prior Publication Data

US 2003/0121171 A1 Jul. 3, 2003

(30) Foreign Application Priority Data

Dec. 27, 2001 (TW) ........................................ 90132633 A

(51) Int. Cl.[7] ............................... F26B 5/04; B08B 5/04
(52) U.S. Cl. ............................... 34/406; 34/92; 34/402; 34/407; 34/408; 34/468; 134/21
(58) Field of Search ............................... 34/92, 406, 402, 34/417, 407, 408, 443, 467, 468, 469; 134/1.3, 10, 21

(56) References Cited

U.S. PATENT DOCUMENTS

| | | | | |
|---|---|---|---|---|
| 3,549,528 A | * | 12/1970 | Armstrong | ................... 210/60 |
| 4,702,014 A | * | 10/1987 | Karrer | ........................... 34/15 |
| 5,425,815 A | * | 6/1995 | Parker et al. | .................. 134/26 |
| 5,524,652 A | * | 6/1996 | Neubauer | ................... 134/95.2 |
| 5,785,875 A | * | 7/1998 | Hawthorne et al. | ........... 216/41 |
| 6,254,734 B1 | * | 7/2001 | Sephton | ........................... 203/2 |
| 6,272,770 B1 | * | 8/2001 | Slutsky et al. | ................. 34/596 |

FOREIGN PATENT DOCUMENTS

JP 55-73301 * 6/1980 ............ B01D/3/10

* cited by examiner

*Primary Examiner*—K. B. Rinehart
(74) *Attorney, Agent, or Firm*—Rosenberg, Klein & Lee

(57) ABSTRACT

A method for performing multiple cleaning and vacuum drying operations in enclosed vessels uses cleaning and vacuum drying apparatus, low-dissolved-air cleaning solution, and drain-to-vacuum process to produce vacuum in a cleaning vessel, so that influence of air pressure on the operations is minimized. The method utilizes physical features that boiling points of general liquids lower with reduced pressure, that liquid saturated vapor pressure reduces with lowered temperature, and that two vacuum vessels of different working temperatures would have a pressure differential between their saturated vapor pressures, and uses heat control units and heat egress units to regulate temperature and pressure in the vacuumized cleaning vessel, so that wet clean, dry clean, vacuum heat drying, and vacuum freeze drying can be performed on the same apparatus, and low-pressure gas used in the dry clean and cleaning solution and waste solution can be recovered to achieve environment protection and energy saving.

33 Claims, 11 Drawing Sheets

METHOD AND APPARATUS FOR PERFORMING MULTIPLE CLEANING AND VACUUM DRYING OPERATIONS IN ENCLOSED VESSELS

FIELD OF THE INVENTION

The present invention relates to method and apparatus for performing wet clean, dry clean, vacuum heat drying, and vacuum freeze drying in one process without using a vacuum system, and capable of recovering low-pressure gas used in dry clean, and recovering cleaning solution and waste solution to achieve environment protection and energy saving. The apparatus includes at least one drain-to-vacuum apparatus, at least one vacuum vessel produced from the drain-to-vacuum apparatus, at least one heat control unit for vaporizing or sublimating cleaning solution, at least one heat egress unit for condensing vapors of the cleaning solution, and other auxiliary instruments, including a plurality of connection pipes. A low-dissolved-air cleaning solution is used and a drain-to-vacuum process is performed on the drain-to-vacuum apparatus, such that a cleaning vessel, which is not fully filled with the cleansing solution, becomes a vacuum vessel having very low internal air pressure and vapor pressure from the cleaning solution, enabling a minimized influence of any air pressure on any operation performed on the cleaning and vacuum drying apparatus. The present invention employs physical features that boiling points of general liquids lower with reduced pressure, that liquid saturated vapor pressure reduces with lowered temperature, and that two vacuum vessels of different working temperatures would have a pressure differential between their saturated vapor pressures, so that the enclosed cleaning vessel in a sealed state can be directly used to perform vacuum heat drying or vacuum freeze drying after dry and wet cleans have been completed therein. Therefore, wet clean, dry clean, vacuum heat drying, and vacuum freeze drying can be completed in one process, and low-pressure gas used in dry clean and cleaning solution and waste solution can be recovered to achieve environment protection and energy saving.

BACKGROUND OF THE INVENTION

In a general cleaning and drying process, there is usually provided one or multiple clean working vessels, at where a workpiece is cleaned before being transferred to a next work platform for drying. For a finished product subject to heat deterioration, vacuum drying is particularly needed. When a cleaned finished product is moved in and exposed to atmosphere, it would be contaminated by particles again. Thus, it is desirable to develop a method to complete cleaning and vacuum drying of a workpiece in the same one cleaning vessel without the need of using an expensive vacuum system and to largely reduce related manufacturing costs.

It is a common practice in a cleaning process to use chemical solutions to clean off residual substances on the workpiece surface, such as particles, oxides, metal impurities, oil films, etc. It is possible that hazardous substances leak due to vaporization during the cleaning process. Such hazardous substances tend to explode and cause fires, resulting in serious damages and losses and adversely affecting operators' health. Therefore, a cleaning system using enclosed vessels has advantages of reduced consumption of chemical solutions and pure water, and reduced emission of waste gases and reduced draining of waste water, as compared with a conventional open cleaning system.

In a known cleaning process using enclosed vessels, an amount of cleaning solution is introduced into an enclosed cleaning vessel that is sealed in a predetermined manner, and auxiliary equipment of the cleaning vessel removes contaminants from the surface of the workpiece. After the cleaning is completed, the cleaning solution is drained and the cleaned workpiece is removed from the cleaning vessel and transferred to another work platform for drying.

In a known dry clean process, a vacuum system is employed to draw air out of the cleaning vessel to produce vacuum therein. Thereafter, a type of gas is introduced into the vessel to chemically react with the workpiece to be cleaned, so that oxides on the surface of the workpiece are reduced. The cleaning gas is then drawn, and the workpiece is washed with pure water to create very clean, particle-free surface having a layer of natural oxide film. However, the use of vacuum system considerably increases the cleaning cost.

In a known vacuum heat drying process, a vacuum pump is employed to draw a working vessel to produce proper degree of vacuum therein. The vacuumized working vessel is then heated at a low temperature, so that moisture and volatile matters in the workpiece to be dried vaporize into vapors that are drawn out with the vacuum pump to dry the workpiece. To protect equipment included in the vacuum system from too much heat and vapors produced during heating and vaporization, it is necessary to install refrigerant compressor system and other equipment on the working vessel leading the vacuum pump, so as to condense the gaseous vapors into liquid water. This prevents the existing vacuum heat drying process from being a good design.

In a known vacuum freeze drying process, a workpiece to be dried is first frozen until moisture in the workpiece is frozen into solid state. Thereafter, a vacuum drying vessel is drawn to produce vacuum and reduce internal pressure thereof, so that the solid-state water in the workpiece to be dried is sublimated and drawn to produce vacuum in the drying vessel. This process is disadvantageous because it uses a refrigerant compressor to freeze the workpiece to be dried and uses a vacuum pump to draw the vacuum drying vessel to produce vacuum therein at the same time. At this stage, liquid water in the workpiece to be dried has not yet been frozen into the solid state, and gas drawn out of the vacuum system contains saturated vapors from the vaporized liquid water. The saturated vapors tend to condense into drops in the vacuum system to damage parts and components thereof. Although it is possible to install a freezing system before the vacuum pump to freeze the saturated vapors contained in the air drawn out of the vacuum drying vessel, the drying cost would increase accordingly. Therefore, the existing vacuum freeze drying process is not a perfect design.

With the existing processes, cleaning operation and vacuum drying operation are separately conducted in different working environments. Therefore, a workpiece or a product could not be cleaned and vacuum dried in the same one cleaning vessel, resulting in largely increased operating cost and considerable inconvenience in handling the cleaning and vacuum drying operations.

It is therefore tried by the inventor to develop improved method and apparatus for performing multiple cleaning and vacuum drying operations to eliminated is advantages existing in the above-mentioned conventional cleaning and vacuum drying techniques.

SUMMARY OF THE INVENTION

A primary object of the present invention is to provide cleaning and vacuum drying method and apparatus for performing multiple operations of wet clean, dry clean, vacuum heat drying, and vacuum freeze drying in enclosed vessels in one process without using a vacuum system, and capable of recovering low-pressure gas used in the dry clean and recovering cleaning solution and waste solution to achieve environment protection and energy saving.

The cleaning and vacuum drying apparatus of the present invention includes at least one drain-to-vacuum apparatus, at least one vacuum vessel created via the drain-to-vacuum apparatus, at least one heat control unit for vaporizing or sublimating the cleaning solution, at least one heat egress unit for condensing vapors, and other auxiliary apparatus, such as connecting pipes. The heat control unit vaporizes or sublimates the liquid or solid-state cleaning solution in the vacuumized cleaning vessel, and the heat egress unit condenses the gaseous cleaning solution in the vacuumized cleaning vessel into liquid or solid-state cleaning solution. The drain-to-vacuum apparatus uses low-dissolved-air cleaning solution and a drain-to-vacuum process to produce vacuum in the cleaning vessel, so that the cleaning vessel becomes a vacuum vessel having very low internal air pressure and vapor pressure from the cleaning solution to minimize the influence of air pressure on the whole process. Meanwhile, the present invention uses the physical features that boiling points of general liquids lower with reduced pressure, that liquid saturated vapor pressure reduces with lowered temperature, and that two vacuum vessels of different working temperatures would have a pressure differential between their saturated vapor pressures, and uses heat control unit and heat egress unit to regulate temperature and vapor pressure inside the vacuumized cleaning vessel, so that the heat control unit may introduce low-temperature heat energy or waste heat for the cleaning solution left on a workpiece to absorb heat of vaporization and be vaporized into gas. With these arrangements, dry and wet cleans, vacuum heat drying, and vacuum freeze drying can be completed within the same one cleaning vessel; and the recovery of low-pressure gas used in dry clean and the recovery of cleaning solution and waste solution can also be achieved.

Another object of the present invention is to provide cleaning and vacuum drying method and apparatus that increases the degree of vacuum of cleaning vessel by using a general drawing pump to reduce the pressure in a sealed lower vessel instead of using a vacuum system. When vacuum has been produced in the cleaning vessel, the cleaning vessel becomes a vacuumized cleaning vessel having very low internal air pressure and vapor pressure produced by the cleaning solution in the cleaning vessel. Therefore, the influence of air pressure on vacuum heat drying and vacuum freeze drying is minimized to effectively reduce costs of the cleaning and drying process.

The present invention relates to cleaning and vacuum drying method and apparatus for performing multiple operations of wet clean, dry clean, vacuum heat drying, and vacuum freeze drying in enclosed vessels in one process without using a vacuum system, and capable of recovering low-pressure gas used in the dry clean and recovering cleaning solution and waste solution to achieve environment protection and energy saving.

The cleaning and vacuum drying apparatus of the present invention includes at least one drain-to-vacuum apparatus, at least one vacuum vessel created via the drain-to-vacuum apparatus, at least one heat control unit for vaporizing or sublimating the cleaning solution, at least one heat egress unit for condensing vapors, and other auxiliary apparatus, such as connecting pipes. The heat control unit vaporizes or sublimates the liquid or solid-state cleaning solution in the vacuumized cleaning vessel, and the heat egress unit condenses the gaseous cleaning solution in the vacuumized cleaning vessel into liquid or solid-state cleaning solution. The drain-to-vacuum apparatus employs the principle that a liquid height is maintain under pressure to drain the cleaning solution in the cleaning vessel, so that the cleaning vessel becomes a vacuum vessel having very low internal air pressure and vapor pressure from the cleaning solution. The very low internal air pressure exists because air dissolved in the cleaning solution diffuses through vacuumized volume in the cleaning vessel when the liquid is drained from the enclosed cleaning vessel to produce vacuum therein. Therefore, the use of such low-dissolved-air cleaning solution as the cleaning solution in the drain-to-vacuum process is helpful in minimizing the influence of air pressure on the whole process. Meanwhile, the present invention uses the physical features that boiling points of general liquids lower with reduced pressure, that liquid saturated vapor pressure reduces with lowered temperature, and that two vacuum vessels of different working temperatures would have a pressure differential between their saturated vapor pressures, and uses heat control unit and heat egress unit to regulate temperature and vapor pressure inside the vacuumized cleaning vessel, so that the heat control unit may introduce low-temperature heat energy or waste heat for the cleaning solution left on a workpiece to absorb heat of vaporization and be vaporized into gas. With these arrangements, dry and wet cleans, vacuum heat drying, and vacuum freeze drying can be completed within the same one cleaning vessel; and the recovery of low-pressure gas used in dry clean, the producing of medium vacuum vessels, and the recovery of cleaning solution and waste solution can also be done to achieve environment protection and energy saving.

In brief, by using the low-dissolved-air cleaning solution and the drain-to-vacuum process on the cleaning and vacuum drying apparatus of the present invention, operations of 1) wet clean and vacuum heat drying, 2) wet clean and vacuum freeze drying, and 3) wet and dry cleans can be linked to perform on the same one apparatus; and, by using heat control unit and heat egress unit, operations of 4) vacuum heat drying, 5) vacuum freeze drying, 6) recovering cleaning solution and waste solution, and 7) producing a vessel of medium vacuum to recover the low-pressure gas used in the dry clean can be continued directly on the same apparatus.

Cleaning and Vacuum Drying Apparatus

The cleaning and vacuum drying apparatus of the present invention includes at least one drain-to-vacuum apparatus, at least one vacuum vessel created via the drain-to-vacuum apparatus, at least one heat control unit for vaporizing or sublimating the cleaning solution, at least one heat egress unit for condensing vapors, and other auxiliary apparatus, such as connecting pipes. Wherein, a cleaning vessel included in the cleaning and vacuum drying apparatus 1) may be separated from the drain-to-vacuum apparatus to serve as an independent vacuum vessels; 2) may serve as a vessel for dry clean, wet clean, vacuum heat drying, vacuum freeze drying, recovering cleaning solution and waste solution; 3) may be equipped at proper positions with other auxiliary equipment, such as heat control unit and heat egress unit, depending on actual needs; 4) may be connected to the vacuum vessels through connection pipes; 5) may be connected to a recovery container having normal internal pressure; and 6) may be connected to a cleaning vessel included in another drain-to-vacuum apparatus. With a saturated vapor pressure differential due to a temperature difference between the vacuumized cleaning vessel and the vacuum vessel, the solution in the vacuumized cleaning vessel is caused to absorb heat of vaporization and produce vapors that flow toward the vacuum vessels. The heat egress units are provided on the connection pipes between the vacuumized cleaning vessels and the vacuum vessels at proper positions to condense gaseous cleaning solution into liquid cleaning solution that is then recovered and stored in the vacuum vessels. The vacuum vessels may also be used to recover low-pressure gas used in the dry clean. In performing the operations of vacuum heat drying, recovering cleaning solution or waste solution, using low-dissolved-air cleaning solution, and producing medium vacuum vessels, the heat control unit provides a temperature range on a gas-liquid equilibrium curve of the cleaning solution. And, in performing the operation of vacuum freeze drying, the heat control unit and the heat egress unit provide temperature ranges on a gas-solid equilibrium curve of the cleaning solution.

When the cleaning and vacuum drying apparatus includes a plurality of cleaning vessels, these cleaning vessels can be interconnected by means of vacuum valves, and workpieces can be transferred among these cleaning vessels by means of conveyers, so that a serial multi-vessel cleaning and vacuum drying apparatus is provided.

Drain-to-Vacuum Apparatus

The drain-to-vacuum apparatus provides a link pipe having valve control function. The link pipe is connected at two ends to a cleaning vessel and a lower vessel that have a relative height difference between them. Both the cleaning vessel and the lower vessel are enclosed vessels and can be sealed in a predetermined manner. The lower vessel can be sealed and has increased volume and liquid surface cross-section area. The lower vessel is not fully filled with the cleaning solution, and has internal pressure that is set according to many factors, including the relative height difference between the cleaning vessel and the lower vessel, the specific gravity of the cleaning solution used in the cleaning and drying operations, the volume of the cleaning vessel, and the volume of the lower vessel. For the cleaning solution in the cleaning vessel to be completely drained into the lower vessel when the cleaning solution has very low specific gravity and the relative height difference between the cleaning vessel and the lower vessel is very small, the lower vessel usually has internal pressure that is much lower than the atmospheric pressure. The lower vessel is connected to a drawing pump for drawing the cleaning solution out of the lower vessel into a recovery container having normal internal pressure or a rear treatment vessel. When the lower vessel is in a sealed state, starting the drawing pump will cause the internal pressure of the lower vessel to reduce with the lowered liquid level in the lower vessel.

Drain-to-Vacuum Process

The drain-to-vacuum process of the present invention is based on the Torricelli vacuum producing principle, namely, a liquid level is maintained under pressure. The lower vessel has internal pressure that is set according to the relative height difference between the cleaning vessel and the lower vessel, the specific gravity of the cleaning solution, the volume of the cleaning vessel, and the volume of the lower vessel, and is regulated by means of the drawing pump. After the cleaning vessel is fully filled with the cleaning solution and then sealed, and a valve on the link pipe is opened, the cleaning solution in the cleaning vessel flows through the link pipe into the sealed lower vessel, and the pressure in the sealed lower vessel rises with the increasing cleaning solution. When the cleaning solution stops flowing, a still height thereof is the height of the cleaning solution that could be maintained by final liquid surface pressure in the sealed lower vessel 31. Thereafter, the valve on the link pipe is closed and the drawing pump is started again to draw the cleaning solution out of the sealed lower vessel into the recovery container or the rear treatment vessel. Meanwhile, the internal pressure of the sealed lower vessel is regulated to facilitate next cycle of the operation. Repeat the above procedures, until the still height of the cleaning solution at where the cleaning solution stops flowing reaches an actually required height.

Linked Wet Clean and Vacuum Heat Drying

When the cleaning and vacuum drying apparatus of the present invention is set for the operation of wet clean, the low-dissolved-air cleaning solution and the drain-to-vacuum process are used to produce vacuum in the cleaning vessel depending on actual needs. The vacuumized cleaning vessel is then used to perform the operation of vacuum heat drying, so that any residual moisture or organic solvent in the cleaning vessel is vaporized and recovered to the vacuum vessel, and the cleaned and dried workpiece is free of water mark and contamination by particles.

Linked Wet Clean and Vacuum Freeze Drying

The low-dissolved-air cleaning solution and the drain-to-vacuum process are used on the cleaning and vacuum drying apparatus of the present invention to produce vacuum in the cleaning vessel, so that the vacuumized cleaning vessel may be directly used to perform the next operation of vacuum freeze drying. Thus, the operations of wet clean and vacuum freeze drying could be performed in one process without using a vacuum system.

Linked Wet Clean and Dry Clean

After vacuum is produced in the cleaning vessel of the cleaning and vacuum drying apparatus of the present invention through the drain-to-vacuum process, a valve connecting the vacuumized cleaning vessel and a gas vessel for the dry clean operation is opened for cleaning gas in the gas vessel to flow into the vacuumized cleaning vessel via a connection pipe. The valve is then timely closed for the vacuumized cleaning vessel to have low gas pressure therein. After the dry clean is completed, a valve connecting the cleaning vessel and the vacuum vessel is opened, and the cleaning solution is introduced into the cleaning vessel via a bottom side thereof. While the liquid level in the cleaning vessel rises, the low-pressure cleaning gas is gradually recovered and stored in the vacuum vessel. After the cleaning vessel is completely filled with the cleaning solution, the valve connecting the cleaning vessel to the vacuum vessel is closed to complete the recovery of the low-pressure gas used in the dry clean.

Low-Dissolved-Air Cleaning Solution

When the drain-to-vacuum process is used on the cleaning and vacuum drying apparatus of the present invention to produce vacuum in a part of volume of the cleaning vessel, the liquid level of the cleaning solution becomes still in the cleaning vessel and covers the heat control unit provided in the cleaning vessel. When heat energy is continuously introduced into the cleaning solution, the liquid surface of the cleaning solution becomes boiled. At this point, air dissolved in the cleaning solution diffuses into the vacuumized volume of the cleaning vessel. The cleaning vessel is now in a normal pressure state, and the recovery container having normal internal pressure is used to collect from the cleaning vessel the air-diffused cleaning solution.

The temperature range of the heat control unit is on the gas-liquid equilibrium curve of the cleaning solution. Since the boiling point of the cleaning solution lowers with the reduced pressure in the cleaning vessel, the present invention may introduce low-temperature heat energy or waste heat to vaporize the cleaning solution. The cleaning vessel may be a vessel having a large cross-section area at the liquid surface in order to provide an increased vaporization area.

Vacuum Heat Drying

When the drain-to-vacuum process is implemented on the cleaning and vacuum drying apparatus of the present invention, the cleaning vessel can become a vacuumized cleaning vessel having very low internal air pressure and vapor pressure from the cleaning solution. Utilizing the principle that temperature difference results in saturated vapor pressure differential, the vacuum vessel is connected to the cleaning vessel, and the heat egress unit is mounted at a proper position on the connection pipe between the cleaning vessel and the vacuum vessel to condense the gaseous cleaning solution flowing toward the vacuum vessel into liquid that is then recovered and stored in the vacuum vessel.

The heat control unit of the cleaning vessel provides heat of vaporization to vaporize the cleaning solution left on the workpiece being cleaned. When the temperature of the heat control unit keeps unchanged and the internal pressure of the cleaning vessel does not change any longer, it means the temperature and the internal pressure of the cleaning vessel are on the gas-liquid equilibrium curve of the cleaning solution. If the internal pressure of the cleaning vessel does not reach the saturated vapor pressure at that temperature, the workpiece to be dried could absorb the heat of vaporization from the heat control unit to vaporize the cleaning solution left on the workpiece. To continuously vaporize the cleaning solution left on the workpiece to be dried, the above-mentioned principle of pressure differential is utilized to drive vapors to flow toward the heat egress unit on the connection pipe connected to the vacuum vessel, so that the gaseous cleaning solution is condensed into liquid and then recovered and stored in the vacuum vessel. In this manner, the internal pressure of the cleaning vessel is always maintained lower than the saturated vapor pressure at the vaporization temperature. Since general liquid has a boiling point that lowers with reduced pressure, the heat control unit may introduce low-temperature heat energy or waste heat to vaporize the cleaning solution.

When the low-dissolved-air cleaning solution is used as the cleaning solution in the drain-to-vacuum process, the operation of vacuum heat drying is not influenced by the air pressure, enabling a more stable pressure differential between the vacuum vessel and the vacuumized cleaning vessel and the use of heat energy of lower temperature.

Vacuum Freeze Drying

By using the low-dissolved-air cleaning solution and the drain-to-vacuum process on the cleaning and vacuum drying apparatus of the present invention, vacuum can be produced in the cleaning vessel for the same to become a vacuumized cleaning vessel having very low internal air pressure and vapor pressure from the cleaning solution. The heat control unit and the heat egress unit of the cleaning vessel provide temperature ranges are on the gas-solid equilibrium curve of the cleaning solution. The heat control unit controls the temperature of the workpiece to be dried. That is, the heat control unit is able to lower the temperature of the workpiece to be dried to a preset temperature and provides heat of sublimation to sublimate solid-state cleaning solution inside the workpiece. The heat egress unit controls the pressure inside the vacuumized cleaning vessel. That is, the heat egress unit is able to condense the sublimated cleaning solution into solid-state cleaning solution and to provide heat of sublimation to sublimate the solid-state cleaning solution left in the vacuumized cleaning vessel.

In the course of vacuum freeze drying a workpiece to be dried in the cleaning vessel, when the temperature of the heat control unit in the cleaning vessel keeps unchanged and a rate of sublimation equal to a rate of condensation, the internal pressure of the cleaning vessel would not change any longer. That is, the temperature and the internal pressure of the cleaning vessel are on the gas-solid equilibrium curve of the cleaning solution. When the heat control unit is at the sublimation temperature set for it, and if the pressure inside the cleaning vessel does not reach the saturated vapor pressure at that temperature, the workpiece to be dried could absorb the sublimation heat from the heat control unit to sublimate the solid-state cleaning solution on the workpiece to form the gaseous cleaning solution. To continue the sublimation while there is very low air pressure in the cleaning vessel, the heat egress unit is used to condense the previously sublimated cleaning solution into solid state, so that the internal pressure of the cleaning vessel is always maintained lower than the saturated vapor pressure at the sublimation temperature.

The heat control unit is able to freeze the workpiece to be dried to the lowest eutectic point of the compositions of the workpiece. In the course of freezing the workpiece to be dried with the heat control unit, it is necessary to prevent the internal pressure of the whole cleaning vessel from reducing with lowered temperature and resulting in incompletely frozen workpiece. Thus, the heat egress unit must vaporize or sublimate the cleaning solution left in the cleaning vessel for the internal vapor pressure of the cleaning vessel to be larger than the saturated vapor pressure at the temperature set for the heat control unit until the workpiece to be dried has been frozen to a temperature lower than its lowest eutectic point.

After the workpiece to be dried has been frozen, it is expected the liquid inside the workpiece has big crystal size to form eye-visible coarse crystals. The coarse crystals leave big voids in the workpiece after they have sublimated, allowing crystals at inner side of the workpiece to keep sublimating and therefore enabling an enhanced drying efficiency. Thus, the workpiece to be dried is pre-frozen under normal pressure and the low-dissolved-air cleaning solution and the drain-to-vacuum process are used to produce vacuum in the cleaning vessel before performing the vacuum freeze drying.

When the low-dissolved-air cleaning solution is used as the cleaning solution in the drain-to-vacuum process, there will be only the vapor pressure from the cleaning solution existing in the vacuumized cleaning vessel. Thus, the operation of vacuum freeze drying is not affected by the air pressure, and both the sublimation and the condensation of the cleaning solution inside the workpiece to be dried are controlled by temperature. In the case the heat egress unit includes means for speeding up the flowing of the gaseous cleaning solution, the gaseous cleaning solution could condense into solid state more quickly to increase the rate of vacuum freeze drying.

Serial Multi-Vessel Vacuum Freeze Drying

In the serial multi-vessel cleaning and vacuum drying apparatus of the present invention, the heat control unit in the first cleaning vessel serves to pre-freeze the cleaned workpiece to be dried under normal pressure, the second cleaning vessel has an initial state in which the low-dissolved-air cleaning solution and the drain-to-vacuum process are used to produce vacuum in the cleaning vessel and serves as the cleaning vessel for performing the vacuum freeze drying, and the third cleaning vessel serves to output the workpiece that has been dried. After the third cleaning vessel is returned to normal internal pressure and the dried workpiece is removed therefrom, it is treated with the low-dissolved-air cleaning solution and the drain-to-vacuum process to become a vacuum vessel again. After the workpiece to be dried has been frozen, it is expected the liquid inside the workpiece has big crystal size to form eye-visible coarse crystals. The coarse crystals leave big voids in the workpiece after they have sublimated, allowing crystals at inner side of the workpiece to keep sublimating and therefore enabling an enhanced drying efficiency. Thus, the workpiece to be dried is pre-frozen under normal pressure and then subjected to vacuum freeze drying.

After the workpiece to be dried is cleaned in the first cleaning vessel, the heat control unit is actuated under normal pressure to pre-freeze the workpiece to be dried. Then, use low-temperature and low-dissolved-air cleaning solution and the drain-to-vacuum process to produce vacuum in the first cleaning vessel, open the vacuum valve and send the workpiece to be dried to the second vacuumized cleaning vessel, close the vacuum valve, lower the temperature of the workpiece to be dried below the eutectic point of the workpiece, and perform the vacuum freeze drying. After the vacuum freeze drying is completed, the vacuum valve is opened, the dried workpiece is sent to the third vacuumized cleaning vessel, and the vacuum valve is closed again. When the third cleaning vessel is returned to normal internal pressure, the dried workpiece is removed from the third cleaning vessel.

Recovering Cleaning Solution and Waste Solution

In the cleaning and vacuum drying apparatus of the present invention, a first cleaning vessel is used as a vaporization vessel for vaporizing the cleaning solution or waste solution, and a second cleaning vessel is used as a recovery vessel for recovering clean cleaning solution and waste solution. The vaporization vessel is provided with the heat control unit for supplying heat of vaporization to vaporize the cleaning solution or the waste solution. Since the temperature difference between the vaporization vessel and the recovery vessel results in a saturated vapor pressure differential, gaseous cleaning solution in the vaporization vessel is caused to flow toward the heat egress unit connected to the recovery vessel and be condensed into liquid that is recovered in the recovery vessel.

By using the cleaning solution or waste solution to be recovered and the drain-to-vacuum process, vacuum is produced in the vaporization vessel. The liquid level of the cleaning solution to be recovered becomes still in the vaporization vessel and covers the heat control unit. By using clean cleaning solution or waste solution and the drain-to-vacuum process, vacuum is produced in the recovery vessel. When the cleaning solution or waste solution in the vaporization vessel absorbs heat of vaporization from the heat control unit, and the heat egress unit condenses vapors produced in the vaporization vessel into clean liquid cleaning solution or solution that is recovered to the recovery vessel, the vaporization vessel may be timely replenished with the cleaning solution or waste solution, and the recovery vessel may timely drain the recovered cleaning solution or solution into a recovery container having normal internal pressure. Thereafter, the drain-to-vacuum process is implemented again to make the recovery vessel a vacuum vessel to continue the recovery of clean cleaning solution or solution. Since the boiling point of the cleaning solution or waste solution to be recovered lowers with the reduced pressure, the heat control unit may introduce low-temperature heat energy or waste heat to vaporize the cleaning solution or waste solution. In this manner, the object of environment protection and energy saving can be achieved.

Producing Medium Vacuum Vessel

On the cleaning and vacuum drying apparatus, the low-dissolved-air cleaning solution and the drain-to-vacuum process may be used to produce two vacuumized cleaning vessels, one of which may be detached from the drain-to-vacuum apparatus to serve as a vacuum vessel, and the other one of which is used to recover condensed liquid. Since the temperature difference between the two vessels results in a saturated vapor pressure differential, the liquid left in the vacuum vessel absorbs heat of vaporization to produce gaseous cleaning solution that flows toward the heat egress unit connected to the vacuumized cleaning vessel and be condensed into liquid cleaning solution, which is then recovered to the vacuumized cleaning vessel.

Since the boiling point of general liquid lowers with reduced pressure, the heat control unit may introduce low-temperature heat energy or waste heat to vaporize the cleaning solution left in the vacuum vessel. With the increasing temperature and reducing vapors in the vacuum vessel, the vacuum vessel finally contains only a very small amount of dry vapor therein. The vacuum vessel is then sealed and detached from the drain-to-vacuum apparatus, and the temperature thereof is lowered again. With lowered temperature, the vacuum vessel may become a vacuum vessel close to medium vacuum.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
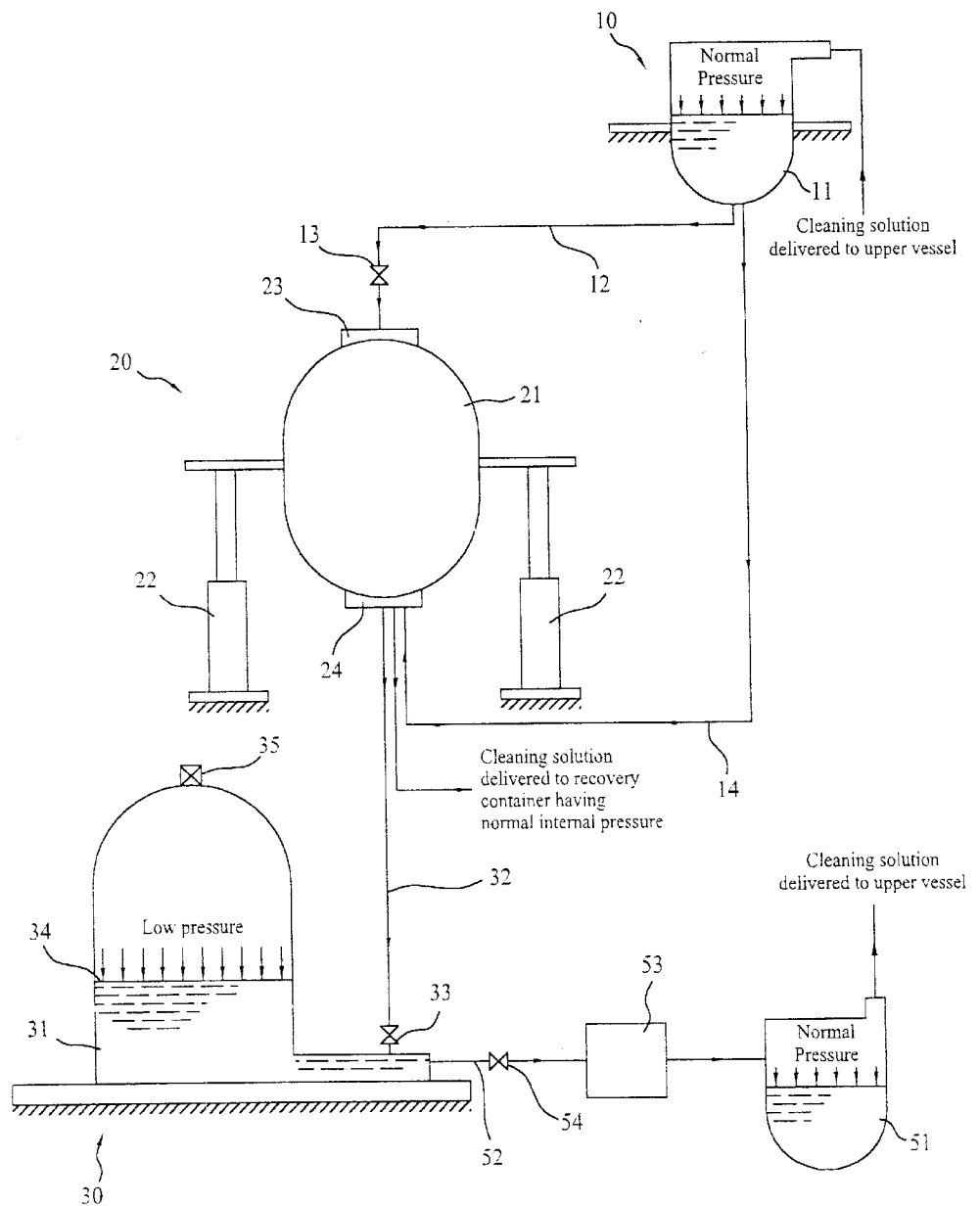
FIG. 1 is a conceptual diagram showing the drain-to-vacuum apparatus of the present invention and the method of implementing the drain-to-vacuum process.

The present invention relates to method and apparatus for performing multiple operations of wet clean, dry clean, vacuum heat drying, and vacuum freeze drying in enclosed vessels in one process without using a vacuum system, and capable of recovering low-pressure gas used in the dry clean and recovering cleaning solution and waste solution to achieve environment protection and energy saving. In the following descriptions, the same reference numerals denote similar components referred to in the present invention.

Please refer to FIG. 1 that is a conceptual diagram showing a drain-to-vacuum apparatus according to the present invention and the method of implementing a drain-to-vacuum process on the drain-to-vacuum apparatus. As shown, the drain-to-vacuum apparatus is mounted on a work platform that is generally divided into three levels, namely, upper level 10, middle level 20, and lower level 30. The upper and the lower levels 10, 30 are set to have a fixed height difference between them. The middle level 20 includes an elevating mechanism 22 for adjusting a height of the middle level 20 relative to the lower level 30.

An upper vessel 11 is provided on the upper level 10 of the work platform at a predetermined position. A type of cleaning solution in a clean state is introduced to store in the upper vessel 11. The upper vessel 11 is connected at a predetermined position of its bottom to a first end of an upper-vessel pipe 12, via which the cleaning solution in the upper vessel 11 flows toward a cleaning vessel 21. An exhausting pipe 14 may be led from a predetermined position on the bottom of the upper vessel 11 to a bottom of the cleaning vessel 21 depending on actual need, so that the cleaning solution in the upper vessel 11 may be introduced into the cleaning vessel 21 via the exhausting pipe 14 to exhaust gas existing in the cleaning vessel 21.

A second end of the upper-vessel pipe 12 is connected to an upper-flow control unit 23, via which the cleaning solution in the upper vessel 11 flows into the cleaning vessel 21. An upper-vessel valve 13 is provided at a predetermined position on the upper-vessel pipe 12 or a predetermined position on a bottom of the upper vessel 11 for controlling downward flow of the cleaning solution from the upper vessel 11 toward the cleaning vessel 21.

The cleaning vessel 21 is located at a predetermined position at the middle level 20 of the work platform. The cleaning vessel 21 is an enclosed vessel that can be sealed in a predetermined manner for treating a workpiece therein. Inlet and outlet for workpiece to be treated as well as other auxiliary tools and instruments are provided on the cleaning vessel 21 depending on actual needs. The upper-flow control unit 23 is provided at a predetermined position on the top of the cleaning vessel 21 to communicate the same with the upper-vessel pipe 12. And, a lower-flow control unit 24 is provided at a predetermined position on the bottom of the cleaning vessel 21 to communicate the same with a lower-vessel pipe 32, via which the cleaning solution flows from the cleaning vessel 21 toward a lower vessel 31 located at a predetermined position on the lower level 30 of the work platform.

A lower-vessel valve 33 is provided on the lower-vessel pipe 32 or the lower vessel 31 at a position lower than a liquid surface 34 in the lower vessel 31 to control the downward flow of the cleaning solution from the cleaning vessel 21 into the lower vessel 31.

The lower vessel 31 is an enclosed vessel that can be sealed in a predetermined manner. The lower vessel 31 has large volume and provides large cross-section area at the liquid surface 34 therein, and is not fully filled with the cleaning solution. Auxiliary tools and instruments may be provided on the lower vessel 31 depending on actual needs. The lower-vessel pipe 32 is connected at an end opposite to the lower-flow control unit 24 to a predetermined position near a lower part of the lower vessel 31 for the cleaning solution to flow from the cleaning vessel 21 into the lower vessel 31. A pump pipe 52 is connected at a first end to a predetermined position at the lower part of the lower vessel 31 and at a second end to a drawing pump 53. An exhaust valve 35 is provided at a predetermined position near a top of the lower vessel 31 that is not in contact with the cleaning solution for regulating internal pressure of the lower vessel 31. A condenser (not shown) may be provided inside the lower vessel 31 depending on actual need to maintain stable liquid surface pressure in the lower vessel 31.

Via the pump pipe 52, the drawing pump 53 draws the cleaning solution from the lower vessel 31 into a rear treatment vessel 51 having normal internal pressure or from the rear treatment vessel 51 into the lower vessel 31, in order to regulate height of and pressure at the liquid surface 34 in the lower vessel 31. A pump valve 54 is provided at a predetermined position on the lower part of the lower vessel 31 or the pump pipe 52 to control a flow of the cleaning solution being drawn by the drawing pump 53 to and from the lower vessel 31.

As mentioned above, the upper-flow control unit 23 is provided at a predetermined position on the top of the cleaning vessel 21 to control flowing of the cleaning solution or gas into and out of the cleaning vessel 21. A plurality of control valves or functionally similar elements may be provided in the upper-flow control unit 23 depending on actual need to control flowing of the cleaning solution or gas into and out of the cleaning vessel 21. Alternatively, other elements may be provided to work with the auxiliary tools and instruments in the cleaning vessel 21. The control valves in the upper-flow control unit 23 may be connected to other devices, such as vacuum vessels, recovery containers having normal internal pressure and the like, or to the upper-vessel pipe 12 via a fixed or detachable joint.

As mentioned above, the lower-flow control unit 24 is provided at a predetermined position on the bottom of the cleaning vessel 21 to control flowing of the cleaning solution or gas into and out of the cleaning vessel 21. A plurality of control valves or functionally similar elements may be provided in the lower-flow control unit 24 depending on actual need to control flowing of the cleaning solution or gas into and out of the cleaning vessel 21. Alternatively, other elements may be provided to work with the auxiliary tools and instruments in the cleaning vessel 21. The control valves in the lower-flow control unit 24 may be connected to other devices, such as recovery containers having normal internal pressure and the like, or to the lower-vessel pipe 32 via a fixed or detachable joint.

As mentioned above, the exhausting pipe 14 is connected at two ends to the upper vessel 11 and the lower-flow control unit 24 of the cleaning vessel 21 for the cleaning solution in the upper vessel 11 to flow into the cleaning vessel 21 via the bottom thereof to exhaust gas existing in the cleaning vessel 21. The exhausting pipe 14 is provided depending on actual need.

The drain-to-vacuum apparatus of FIG. 1 can be set to an initial state through the following steps:
1. Obtain data about specific gravity of the cleaning solution to be used, the volume of the cleaning vessel 21, and the volume of the lower vessel 31; set the relative height difference to be existed between the middle level 20 and the lower level 30 of the work platform; and calculate the pressure at the liquid surface 34 in the lower vessel 31;
2. Supply the cleaning solution to the lower vessel 31 by setting the pump valve 54 to ON, the exhaust valve 35 to ON, and the lower-vessel valve 33 to ON, starting the drawing pump 53 to draw the cleaning solution from the rear treatment vessel 51 having normal internal pressure into the lower vessel 31 until a predetermined liquid level is reached in the lower vessel 31, and setting the exhaust valve 35 to OFF;
3. Supply the cleaning solution to the upper vessel 11 by setting the upper-vessel valve 13 to OFF, filling the upper vessel 11 with the cleaning solution, and keeping the supply of the cleaning solution to maintain a liquid surface in the upper vessel 11 at a predetermined height;
4. Regulate the pressure at the liquid surface 34 in the lower vessel 31 by setting the lower-vessel valve 33 to OFF, starting the drawing pump 53 to draw the cleaning solution from the lower vessel 31 into the rear treatment vessel 51. The pressure at the liquid surface 34 in the lower vessel 31 decreases with the lowered liquid surface 34. When the pressure at the liquid surface 34 in the lower vessel 31 reaches the preset pressure, set the drawing pump 53 to OFF and the pump valve 54 to OFF; and
5. Actuate the elevating mechanism 22 to adjust the relative height difference between the middle level 20 and the lower level 30 of the work platform.

The method of implementing the drain-to-vacuum process on the drain-to-vacuum apparatus of FIG. 1 includes the following steps:
1. Operate the drain-to-vacuum apparatus so that it is in its initial state or in a final state of other operation;
2. Fill the cleaning vessel 21 with the cleaning solution by opening the upper-vessel valve 13, shutting the lower-vessel valve 33, opening the valve in the upper-flow control unit 23 for connecting the latter to the upper-vessel pipe 12, and opening the valve in the lower-flow control unit 24 for connecting the latter to the lower-vessel pipe 32. Due to the force of gravity and the atmospheric pressure or since the cleaning vessel 21 is vacuum, the cleaning solution flows or is sucked from the upper vessel 11 into the cleaning vessel 21 and fill up the upper-vessel pipe 12, the cleaning vessel 21, and the lower-vessel pipe 32;
3. Produce vacuum in the cleaning vessel 21 by shutting the upper-vessel valve 13 and opening the lower-vessel valve 33. The cleaning solution in the cleaning vessel 21 flows into the lower vessel 31. When the cleaning solution becomes still at a height, the still height of the cleaning solution is the height of a cleaning solution having the same specific gravity being maintained under the pressure at the liquid surface 34 in the lower vessel 31. In other words, when the cleaning solution in the cleaning vessel 21 flows into the lower vessel 31 to cause rise of liquid surface 34 in the lower vessel 31, the pressure in the lower vessel 31 increases to maintain the level of the cleaning solution in a balanced state. When the cleaning solution in the cleaning vessel 21 is fully drained, a valve in the upper-flow control unit 23 for connecting the upper-vessel pipe 12 may be shut depending on actual need, and a valve in the lower-flow control unit 24 for connecting the lower-vessel pipe 32 is shut, so that the cleaning vessel 21 becomes a vacuumized cleaning vessel;
4. Drain surplus cleaning solution from the lower vessel 31 to reduce the pressure at the liquid surface 34 thereof. Since cleaning solution in the upper-vessel pipe 12, the cleaning vessel 21, and the lower-vessel pipe 32 completely or partially flows into the lower vessel 31 when vacuum is produced in the cleaning vessel 21, the liquid surface 34 in the lower vessel 31 raises to increase the pressure at the liquid surface 34. To drain the surplus cleaning solution, shut the valve 33 of the lower-vessel, open the pump valve 54, and start the drawing pump 53 to draw the cleaning solution from the lower vessel 31 into the rear treatment vessel 51 until the pressure at the liquid surface 34 reaches the set pressure value, and then shut the pump valve 54; and
5. The above steps complete procedures in one cycle of the drain-to-vacuum process to produce vacuum in the cleaning vessel 21, so as to facilitate a next cycle of the drain-to-vacuum process. In the event the still height of the cleaning solution does not reach an actually required height, return to the above Step 3.

For the cleaning solution to flow into a recovery container having normal internal pressure (not shown) the drain-to-vacuum apparatus of FIG. 1 is further provided with a vent valve (not shown) in the upper-flow control unit 23 to admit air into the cleaning vessel 21, and a valve (not shown) in the lower-flow control unit 24 to communicate with a pipe led to the recovery container.

The method of admitting cleaning solution into the recovery container includes the following steps:
1. Open the vent valve in the upper-flow control unit 23 for the cleaning vessel 21 to have normal internal pressure; and
2. Open the valve connecting the lower-flow control unit 24 and the recovery container for the cleaning solution in the cleaning vessel 21 to flow into the recovery container until the cleaning vessel 21 is fully drained, and then shut both the vent valve of the upper-flow control unit 23 and the valve connecting the lower-flow control unit 24 and the recovery container.

Figure 2:
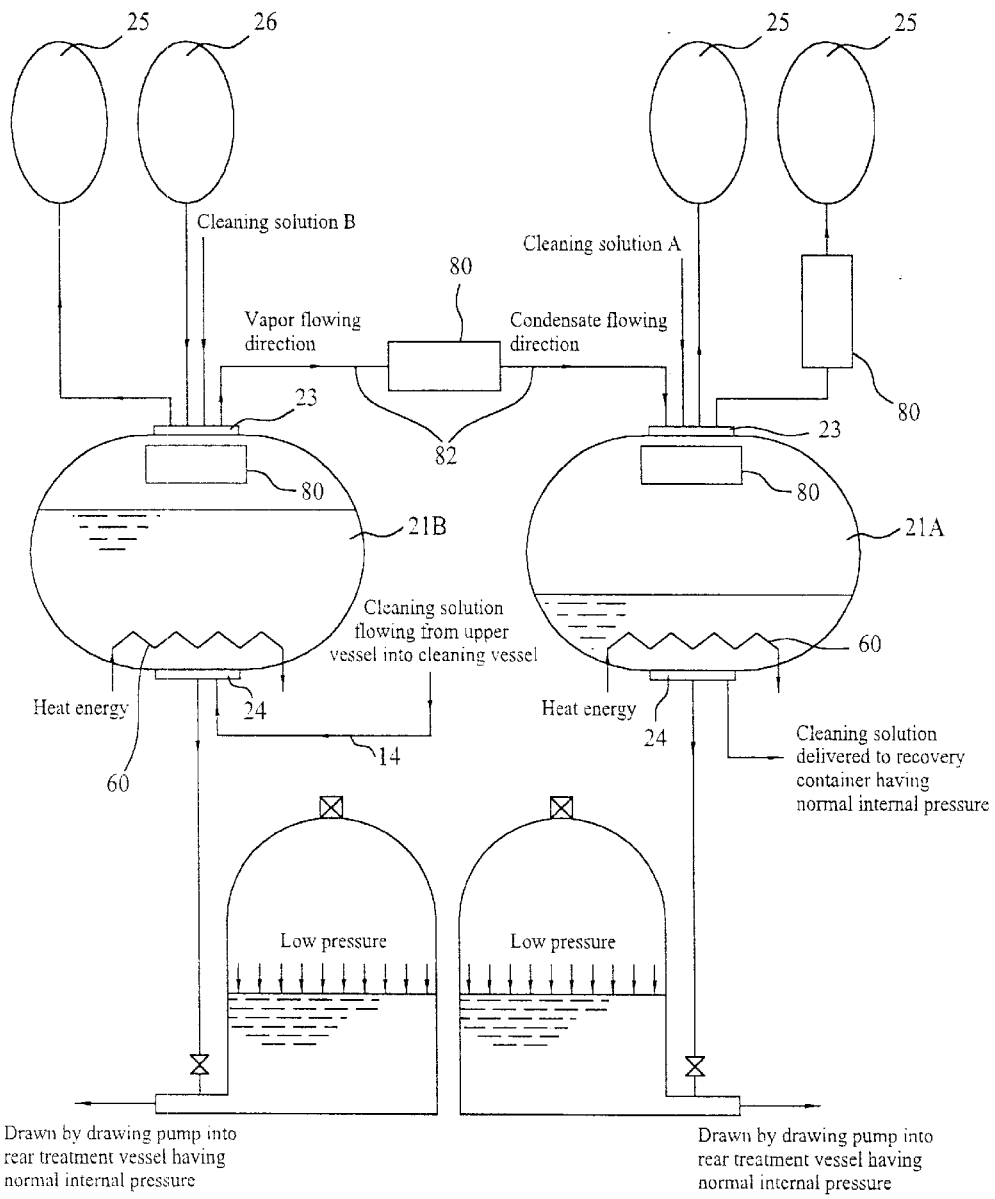
FIG. 2 is a conceptual diagram showing the cleaning and vacuum drying apparatus according to the present invention.

Please refer to FIG. 2 that is a conceptual diagram showing the cleaning and vacuum drying apparatus according to the present invention. In the illustrated figure, the apparatus includes two sets of the drain-to-vacuum apparatus of FIG. 1, a plurality of vacuum vessels 25 obtained from the drain-to-vacuum apparatus, a plurality of heat control units 60 for vaporizing or sublimating the cleaning solution, a plurality of heat egress units 80 for condensing vapors, and other auxiliary devices, such as connection pipes. Upper-flow control units 23 and lower-flow control units 24 in the drain-to-vacuum apparatus are detachable joints and therefore allow the cleaning vessels 21A, 21B to be separable vacuum vessels 25. In addition, the cleaning vessels 21A, 21B are configured to perform multiple operations, including wet clean, dry clean, vacuum heat drying, and vacuum freeze drying, and to recover and store clean cleaning solution and waste solution.

The cleaning vessel 21A of the first drain-to-vacuum apparatus is connected to the cleaning vessel 21B of the second drain-to-vacuum apparatus via a pipe, on a predetermined position of which a heat egress unit 80 is mounted to condense gaseous cleaning solution passing therethrough into liquid cleaning solution. The cleaning vessels 21A, 21B are connected to the vacuum vessels 25 obtained from the two sets of drain-to-vacuum apparatus via pipes, on predetermined positions of which heat egress units 80 are mounted to condense gaseous cleaning solution passing therethrough into liquid cleaning solution. The cleaning vessels 21A, 21B are internally provided with heat egress units 80 to condense gaseous cleaning solution in the cleaning vessels into liquid or solid cleaning solution, and with heat control units 60 to vaporize liquid cleaning solution or sublimate solid-state cleaning solution in the cleaning vessels.

When a low-dissolved-air cleaning solution and the drain-to-vacuum process are used to vacuumize the cleaning vessels, very low internal air pressure and vapor pressure from the cleaning solution exist in the vacuumized cleaning vessels. Therefore, the influence of air pressure to the entire process is minimized. The present invention also employs the physical features that boiling points of general liquids lower with reduced pressure and that two vacuum vessels of different working temperatures would have a pressure differential between their saturated vapor pressures to cause liquid in the vacuumized cleaning vessels 21A, 21B to absorb heat of vaporization to produce vapors that flow through the heat egress units 80 connected to the vacuum vessels 25 to condense into clean and low-temperature cleaning solution and flow into the vacuum vessels 25 and be recovered. With the above arrangements, the cleaning and vacuum drying apparatus of the present invention as shown in FIG. 2 can be used to perform vacuum heat drying, vacuum freeze drying, recovering of cleaning solution or waste solution, producing medium vacuum, and producing low-dissolved-air cleaning solution.

To use a part of the cleaning and vacuum drying apparatus of FIG. 2 to recover low-pressure gas used in dry clean, the cleaning vessel 21B is connected to a corresponding vacuum vessel 25 by connecting the vacuum vessel 25 to a valve in the upper-flow control unit 23 of the cleaning vessel 21B via a pipe, and to a gas vessel 26 by connecting the gas vessel 26 to another valve in the upper-flow control unit 23 of the cleaning vessel 21B via another pipe.

The method of recovering the low-pressure gas used in the dry clean includes the following steps:
1. Produce vacuum in the cleaning vessel 21B by implementing the drain-to-vacuum process to set the drain-to-vacuum apparatus to its initial state or through other operations that has a final state also producing vacuum in the cleaning vessel 21B;
2. Fill the cleaning vessel 21B with gas by opening the valve in the upper-flow control unit 23 for connecting the gas vessel 26, and then shut the same valve when the cleaning vessel 21B has been filled with a predetermined amount of the gas, so that the cleaning vessel 21B becomes a low pressure vessel filled up with the gas; and
3. Exhaust the low-pressure gas in the cleaning vessel 21B at the time the dry clean is completed by opening the valve in the upper-flow control unit 23 for connecting the vacuum vessel 25 and the valve in the lower-flow control unit 24 for connecting the exhausting pipe 14, so that the cleaning solution is upward supplied into the cleaning vessel 21B from a bottom thereof to raise a liquid surface in the cleaning vessel 21B until the lower-pressure gas in the cleaning vessel 21B is fully recovered and stored in the vacuum vessel 25; and
4. Shut the valve in the upper-flow control unit 23 for connecting the vacuum vessel 25.

Figure 3:
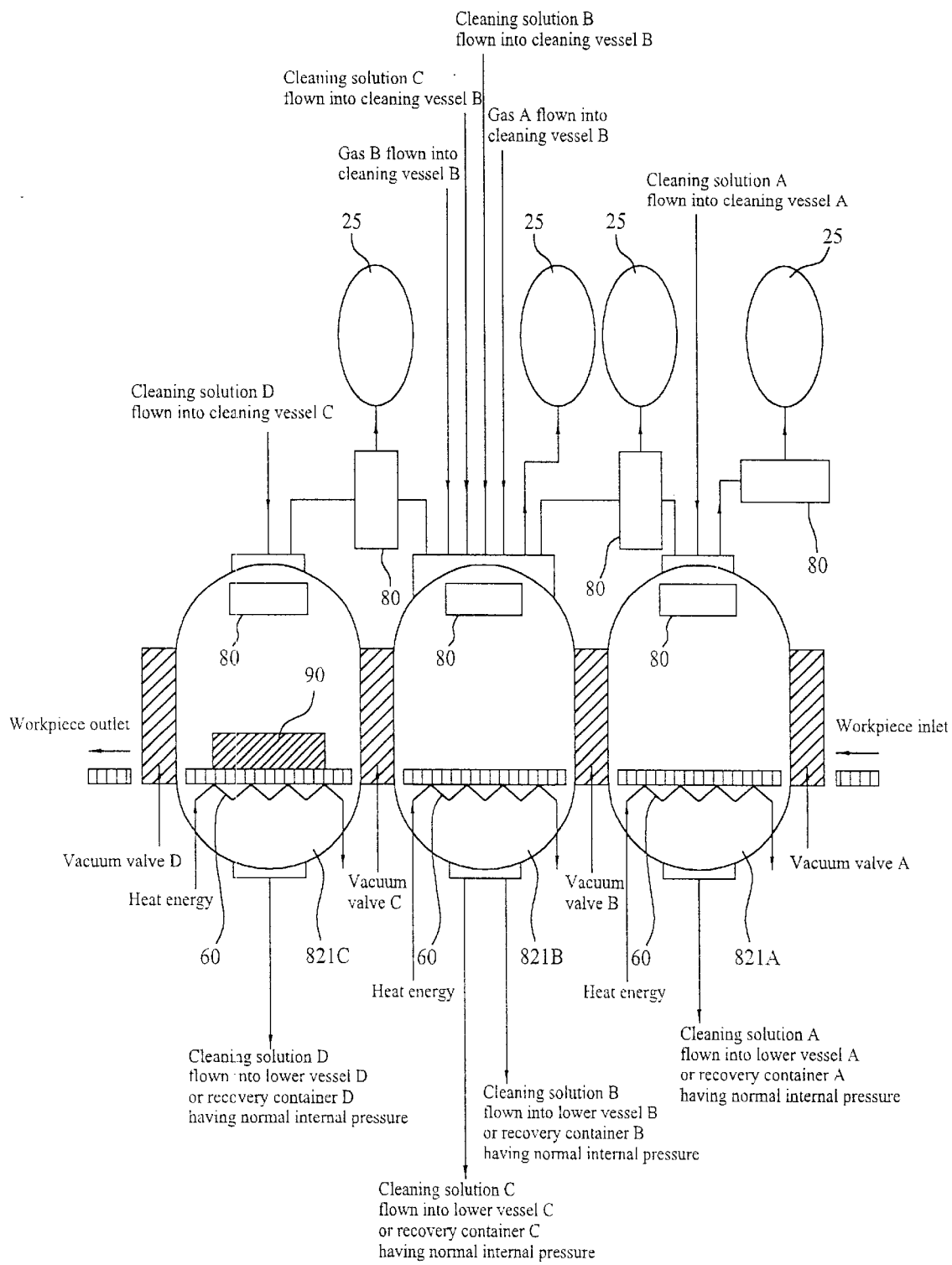
FIG. 3 is a conceptual diagram showing the serial multi-vessel cleaning and vacuum drying apparatus according to the present invention.

Please refer to FIG. 3 that is a conceptual diagram showing an embodiment of a serial multi-vessel cleaning and vacuum drying apparatus according to the present invention. In the illustrated embodiment, there is shown three cleaning vessels 821A, 821B and 821C included in the apparatus. It can be found that this apparatus includes components similar to those included in the cleaning and vacuum drying apparatus of FIG. 2 except that it further includes vacuum valves B, C to serially connect the cleaning vessels 821A, 821B, 821C to one another, and vacuum valves A, D as inlet and outlet, respectively, for a workpiece 90 transferred by means of a conveyer to enter and leave the apparatus, respectively. As shown in FIG. 3, the cleaning vessels 821B and 821C in their initial state are vacuumized cleaning vessels obtained by using the low-dissolved-air cleaning solution and the drain-to-vacuum process on the apparatus or the present invention. The method of performing cleaning and vacuum drying on the serial multi-vessel cleaning and vacuum drying apparatus of FIG. 3 includes the following steps:
1. Open the vacuum valve A and use the conveyer to send the workpiece into the first cleaning vessel 821A that has normal internal pressure, and then shut the vacuum valve A;
2. Use the low-dissolved-air cleaning solution and the drain-to-vacuum process to produce vacuum in the first cleaning vessel 821A when the workpiece therein has been treated with predetermined working procedures; open the vacuum valve B and use the conveyer to send the workpiece into the second cleaning vessel 821B, and then shut the vacuum valve B;
3. Open the vacuum valve D when the third cleaning vessel 821C has normal internal pressure and use the conveyer to send the fully treated workpiece out of the third cleaning vessel 821C; and then use the low-dissolved-air cleaning solution and the drain-to-vacuum process to produce vacuum in the third cleaning vessel 821C.

Figure 4:
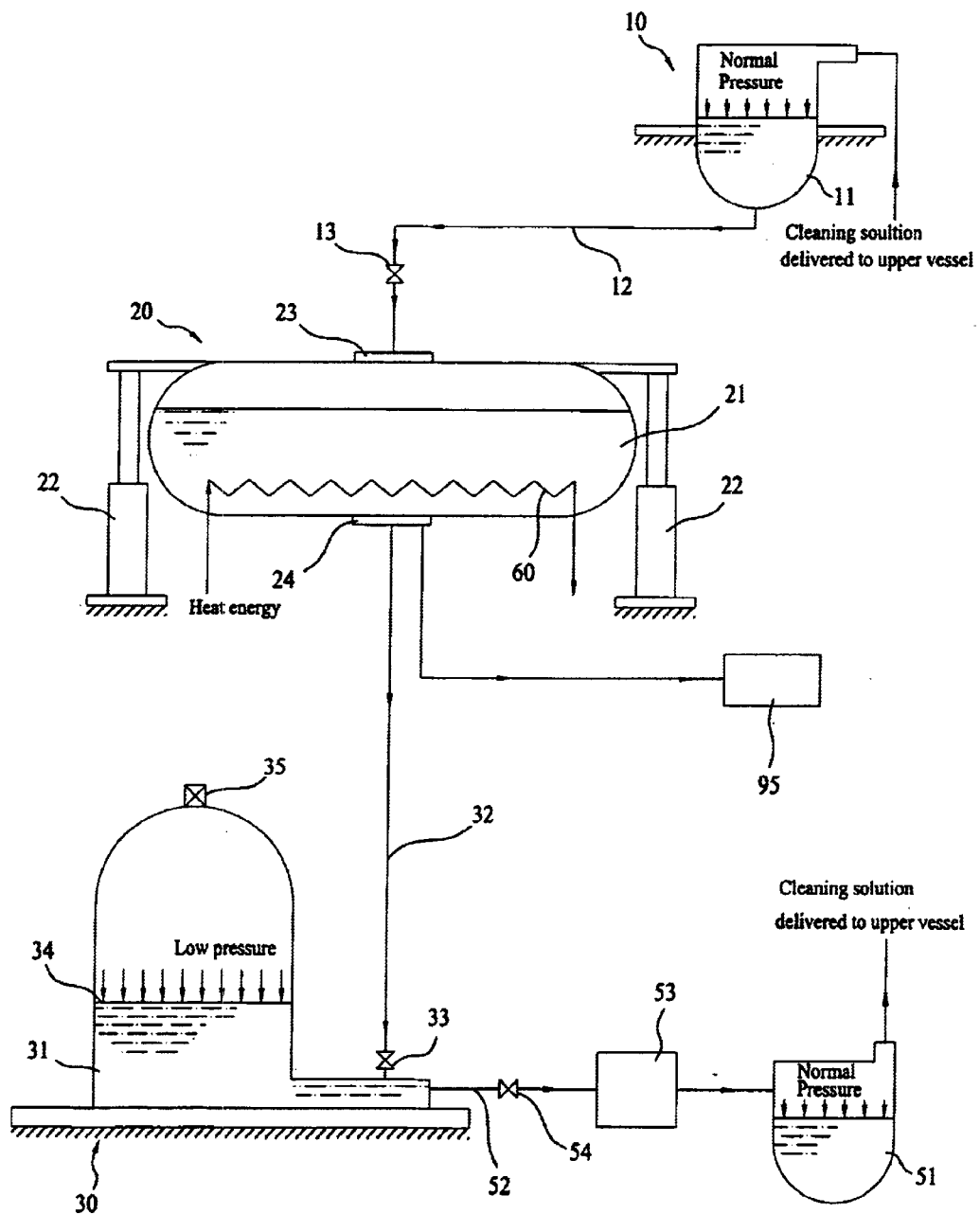
FIG. 4 is a conceptual diagram showing the method of producing and recovering the low-dissolved-air cleaning solution on a part of the cleaning and vacuum drying apparatus of the present invention.

Please refer to FIG. 4 that is a conceptual diagram showing the method of producing and recovering the low-dissolved-air cleaning solution with a part of the cleaning and vacuum drying apparatus of the present invention. As shown in FIG. 4, when the drain-to-vacuum process is used to produce vacuum in the cleaning vessel 21, the liquid level of the cleaning solution becomes still in the cleaning vessel 21 and covers the heat control unit 60. The apparatus of FIG. 4 is configured with the following features:
1. Since boiling points of general liquids lower with reduced pressure, the heat control unit 60 may introduce low-temperature heat energy or waste heat to heat the cleaning solution in the cleaning vessel;
2. The cleaning vessel 21 provides increased cross-section area at the liquid surface therein to facilitate vaporization of the cleaning solution; and
3. A recovery container having normal internal pressure, which is generally denoted by reference numeral 95, is connected to a valve in the lower-flow control unit 24 via a pipe.

The method of producing and recovering the low-dissolved-air cleaning solution with the cleaning and vacuum drying apparatus of FIG. 4 includes the following steps:
1. Set the drain-to-vacuum apparatus included in the cleaning and vacuum drying apparatus to its initial state or a final state of other operation, so that pressure at the liquid surface 34 set for the lower vessel 31 could maintain the height of the still cleaning solution in the cleaning vessel 21 and cover the heat control unit 60;
2. Implement the drain-to-vacuum process to produce vacuum in a part of volume of the cleaning vessel 21;

3. Use the heat control unit 60 to heat the cleaning solution in the cleaning vessel 21 for the liquid surface thereof to boil, and continue heating until the pressure in the cleaning vessel 21 does not increase any longer; and
4. Open a valve of the upper-flow control unit 23 for the cleaning vessel 21 to return to the normal internal pressure, and open the valve of the lower-flow control unit 24 for connecting the recovery container 95 so that the low-dissolved-air cleaning solution in the cleaning vessel 21 is drained into the recovery vessel 95; and thereafter shut the above-mentioned two valves again.

Figure 5:
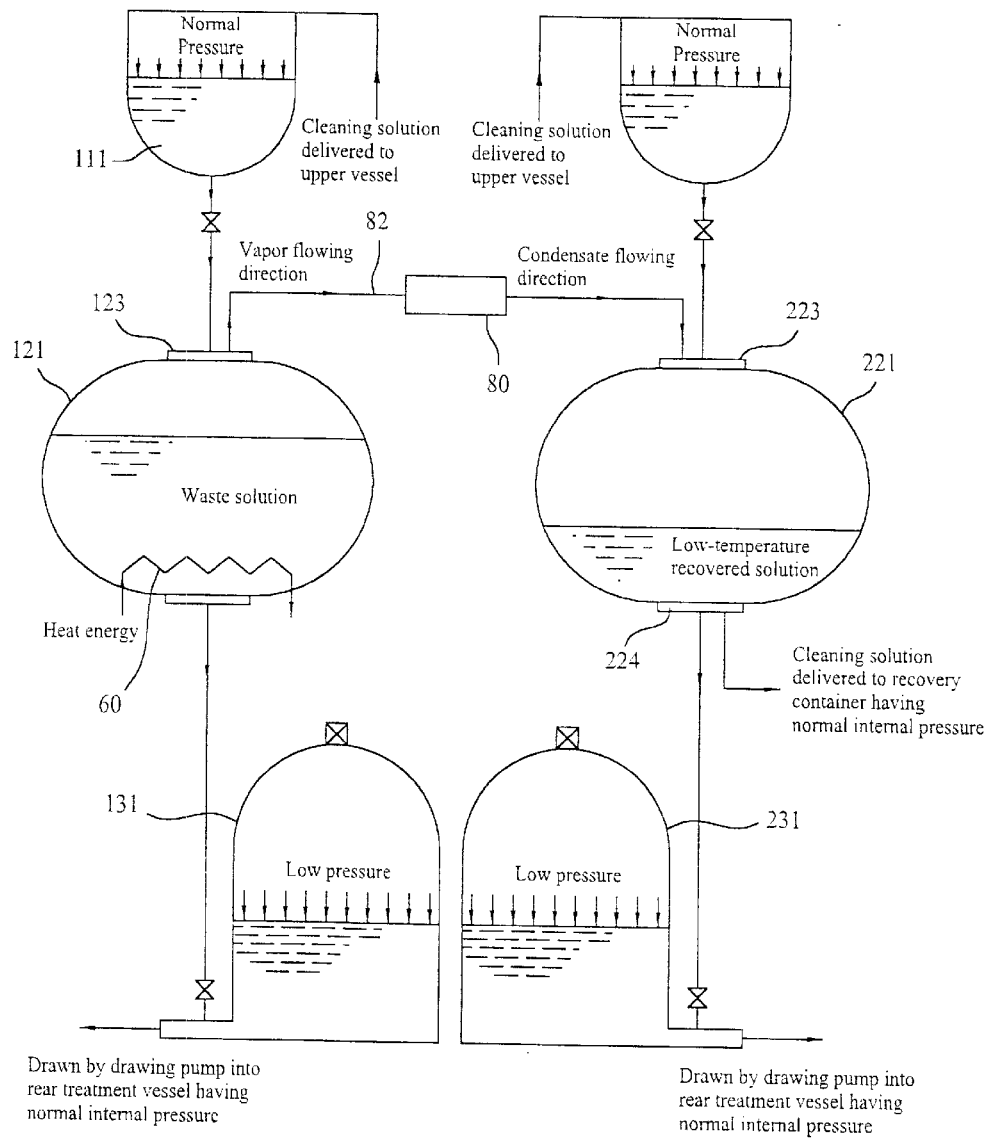
FIG. 5 is a conceptual diagram showing the method of recovering cleaning solution and waste solution on a part of the cleaning and vacuum drying apparatus of the present invention.

Please refer to FIG. 5 that is a conceptual diagram showing the method of recovering cleaning solution and waste solution on a part of the cleaning and vacuum drying apparatus of the present invention. Wherein, the drain-to-vacuum process is employed to produce vacuum in two cleaning vessels, and the physical features that boiling points of general liquids lower with reduced pressure, that liquid saturated vapor pressure reduces with lowered temperature, and that two vacuum vessels of different working temperatures would have a pressure differential between their saturated vapor pressures are employed to recover the cleaning solution and waste solution.

To recover the cleaning solution and waste solution with the cleaning and vacuum drying apparatus of the present invention, one of two cleaning vessels of the apparatus is used as a vaporization vessel 121 to vaporize the cleaning solution or waste solution, and the other cleaning vessel is used as a recovery vessel 221 to recover and store the cleaning solution or waste solution. Since boiling points of general liquids lower with reduced pressure, the heat control unit 60 provided on the bottom of the vaporization vessel 121 at a predetermined position may introduce low-temperature heat energy or waste heat to vaporized the cleaning solution or waste solution in the vaporization vessel 121. The vaporization vessel 121 has an upper-flow control unit 123 connected to an upper-flow control unit 223 of the recovery vessel 221 via a condensate pipe 82, near a middle position of which a heat egress unit 80 is mounted to condense vapors passing therethrough into liquid. The recovery container having normal internal pressure (not shown) is connected to a valve in the lower-flow control unit 224 of the recovery vessel 221. In the course of vaporization, the vaporization vessel 121 can be timely replenished from the upper vessel 111 with the cleaning solution or waste solution to be recovered, in order to maintain the liquid surface in the vaporization vessel 121. It is to be noted the vaporization vessel 121 has a working temperature higher than that of the recovery vessel 221, and the heat control unit 60 has a working temperature on the gas-liquid equilibrium curve of the cleaning solution. To avoid a reduced pressure differential between the vaporization vessel 121 and the recovery vessel 221 due to any air dissolved in the cleaning solution or waste solution to be recovered, operations for producing the low-dissolved-air cleaning solution can be performed in advance to remove air dissolved in the cleaning solution or waste solution to be recovered.

The method of recovering the cleaning solution and waste solution includes the following steps:
1. Operate the drain-to-vacuum apparatus of the vaporization vessel 121 so that it is in the initial state, and the pressure at the liquid surface set for the lower vessel 131 could maintain the height of the still cleaning solution in the vaporization vessel 121 and cover the heat control unit 60;
2. Operate the drain-to-vacuum apparatus of the recovery vessel 221 so that it is in the initial state, and the pressure at the liquid surface set for the lower vessel 231 could produce vacuum in the whole recovery vessel 221 for the latter to become a vacuum vessel;
3. Use the cleaning or waste solution to be recovered and the drain-to-vacuum process on the drain-to-vacuum apparatus of the vaporization vessel 121 to produce vacuum in a partial volume of the vaporizion vessel 121;
4. Use clean and low-temperature cleaning solution or solution and the drain-to-vacuum process on the drain-to-vacuum apparatus of the recovery vessel 221 to produce vacuum in the whole recovery vessel 221 for the same to become a vacuum vessel;
5. Open the valve of the upper-flow control unit 123 connecting the condensate pipe 82 to the vaporization vessel 121 and the valve of the upper-flow control unit 223 connecting the condensate pipe 82 to the recovery vessel 221, use the heat control unit 60 to heat the cleaning solution or waste solution to be recovered and currently contained in the vaporization vessel 121, so that the cleaning solution or waste solution to be recovered absorb heat of vaporization and be vaporized. Since a temperature differential between the recovery vessel 221 and the vaporization vessel 121 results in saturated vapor pressure differential, vaporized gas in the vaporization vessel 121 is caused to diffuse toward the condensate pipe 82 and the heat egress unit 80 and finally condense into the clean and low-temperature cleaning solution or solution and flow into the recovery vessel 221; and
6. When the recovery vessel 221 is saturated, shut the valve communicating the upper-flow control unit 223 of the recovery vessel 221 with the condensate pipe 82 and open the valve of the upper-flow control unit 223 connected to the recovery vessel 221, so that the recovery vessel 221 is returned to the normal internal pressure; open the valve of the lower-flow control unit 224 communicating the recovery vessel 221 with the recovery container having normal internal pressure for the clean cleaning solution or solution to drain into the recovery container; shut the valve of the upper-flow control unit 223 connected to the recovery vessel 221 and the valve of the lower-flow control unit 224 communicating the recovery vessel 221 with the recovery container; use the clean and low-temperature cleaning solution or solution and the drain-to-vacuum process on the drain-to-vacuum apparatus of the recovery vessel 221 to produce vacuum in the whole recovery vessel 221 for the same to become a vacuum vessel; and open the valve on the upper-flow control unit 223 communicating the recovery vessel 221 with the condensate pipe 82 to continue the recovery of the cleaning solution and solution.

Figure 6:
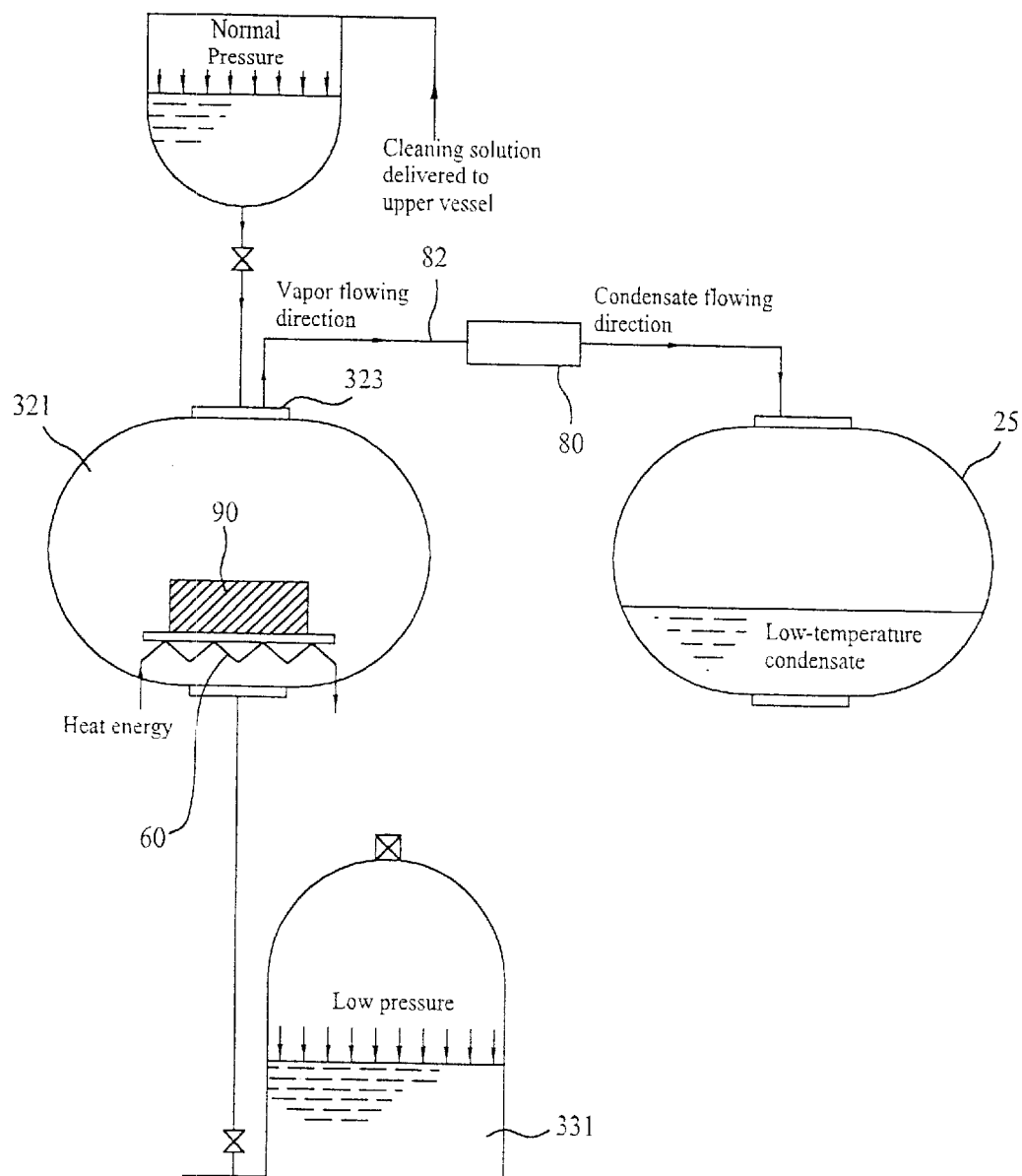
FIG. 6 is a conceptual diagram showing the method of performing vacuum heat drying on a part of the cleaning and vacuum drying apparatus of the present invention.

Please refer to FIG. 6 that is a conceptual diagram showing the method of performing vacuum heat drying on a part of the cleaning and vacuum drying apparatus of the present invention. Wherein, the low-dissolved-air cleaning solution and the drain-to-vacuum process are employed to produce vacuum in the cleaning vessels, and the physical features that boiling points of general liquids lower with reduced pressure, that liquid saturated vapor pressure reduces with lowered temperature, and that two vacuum vessels of different working temperatures would have a pressure differential between their saturated vapor pressures are employed to dry the workpiece. Since boiling points of general liquids lower with reduced pressure, the heat control unit 60 provided on the bottom of the cleaning vessel 321 at a predetermined position may introduce low-temperature heat energy or waste heat to vaporize cleaning solution or waste solution in the cleaning vessel 321. A vacuum vessel 25 is connected to a valve of an upper-flow control unit 323 of the cleaning vessel 321 via a condensate pipe 82, near a middle position of which a heat egress unit 80 is mounted to condense vapors passing therethrough into liquid. It is noted the heat control unit 60 has a working temperature on the gas-liquid equilibrium curve of the cleaning solution, and the cleaning vessel 321 has a working temperature higher than that of the vacuum vessel 25.

The method of performing vacuum heat drying operation on the cleaning and vacuum drying apparatus of FIG. 6 includes the following steps:

1. Produce vacuum in the cleaning vessel 321 by implementing the drain-to-vacuum process to set the drain-to-vacuum apparatus of the cleaning and vacuum drying apparatus to its initial state or through other operations that has a final state also producing vacuum in the cleaning vessel 321 for the same to become a vacuum vessel;
2. Open the valve of the upper-flow control unit 323 communicating the cleaning vessel 321 with the condensate pipe 82, use the heat control unit 60 to heat the cleaning solution left on the workpiece 90, so that the residual cleaning solution absorbs heat of vaporization and vaporizes. Since the temperature difference between the cleaning vessel 321 and the vacuum vessel 25 results in saturated vapor pressure differential, the vaporized gas produced in the cleaning vessel 321 is caused to diffuse from the cleaning vessel 321 toward the condensate pipe 82 and the heat egress unit 80 and be condensed into clean and low-temperature cleaning solution that flows into the vacuum vessel 25 and is recovered; and
3. Continue the recovery of the cleaning solution until the internal pressure of the cleaning vessel 321 does not rise any longer. The vacuum heat drying is now completed.

Figure 7:
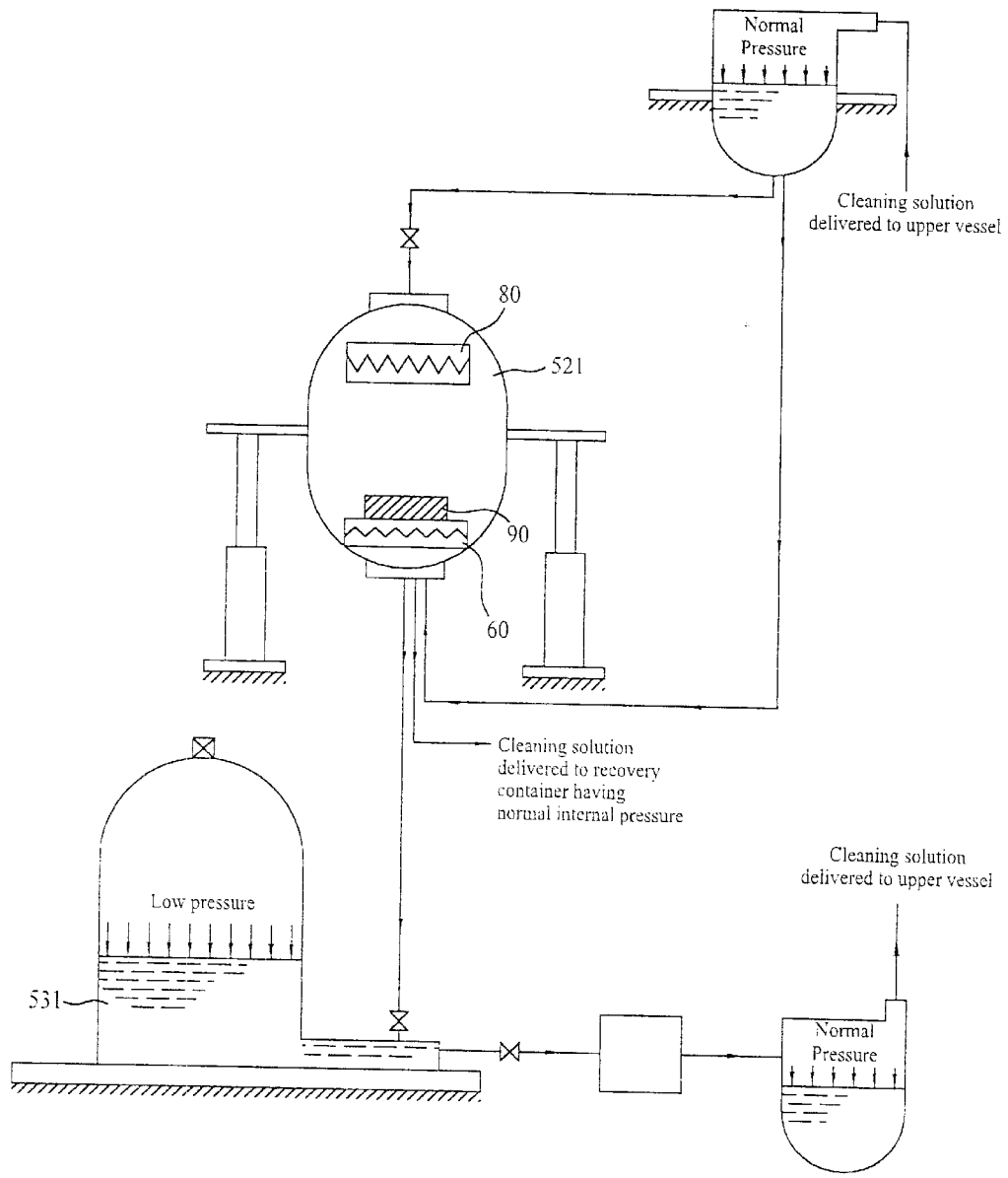
FIG. 7 is a conceptual diagram showing the method of performing vacuum freeze drying on a part of the cleaning and vacuum drying apparatus of the present invention.

Please refer to FIG. 7 that is a conceptual diagram showing the method of performing vacuum freeze drying on a part of the cleaning and vacuum drying apparatus of the present invention. Wherein, low-dissolved-air cleaning solution and the drain-to-vacuum process are used to produce vacuum in the cleaning vessel, and the heat control unit and the heat egress unit are alternately used to control temperature for drying the workpiece. The heat control unit 60 is adapted to lower the temperature of the workpiece 90 to be dried to a point lower than the lowest eutectic point of the compositions thereof and to provide sublimation heat to the workpiece 90 to be dried for the same to sublimate in the course of sublimation. The heat egress unit 80 is adapted to condense vapors produced through sublimation into solid state again, so that the internal pressure of the cleaning vessel 521 is kept below the saturated vapor pressure at the sublimation temperature. Both the heat control unit 60 and the heat egress unit 80 have temperature ranges on the gas-solid equilibrium curve of the cleaning solution used in the vacuum freeze drying.

The method of performing vacuum freeze drying on the cleaning and vacuum drying apparatus of FIG. 7 includes the following steps:

1. Produce vacuum in the cleaning vessel 521 by using the low-dissolved-air cleaning solution and the drain-to-vacuum process to set the drain-to-vacuum apparatus of the cleaning and vacuum drying apparatus to its initial state, or through other operations that have a final state also producing vacuum in the cleaning vessel 521 for the same to become a vacuum vessel;
2. Actuate the heat control unit 60 to lower the temperature of the workpiece 90 to be dried to a point lower than the lowest eutectic point of the compositions thereof, actuate the heat egress unit 80 to provide heat of vaporization to vaporize the cleaning solution left in the cleaning vessel 521, so that vapor pressure in the cleaning vessel 521 is larger than the saturated vapor pressure at the temperature set for the heat control unit 60; and
3. When the workpiece 90 to be dried reaches a temperature lower than the lowest eutectic point of the compositions thereof, set a sublimation temperature for the heat control unit 60 for the latter to provide sublimation heat to sublimate the solid-state cleaning solution in the workpiece 90 to be dried, and use the heat egress unit 80 to condense the gaseous cleaning solution produced in the course of sublimation into the solid-state cleaning solution again, so that the internal pressure of the cleaning vessel 521 is kept below the saturated vapor pressure at the sublimation temperature.

Figure 8:
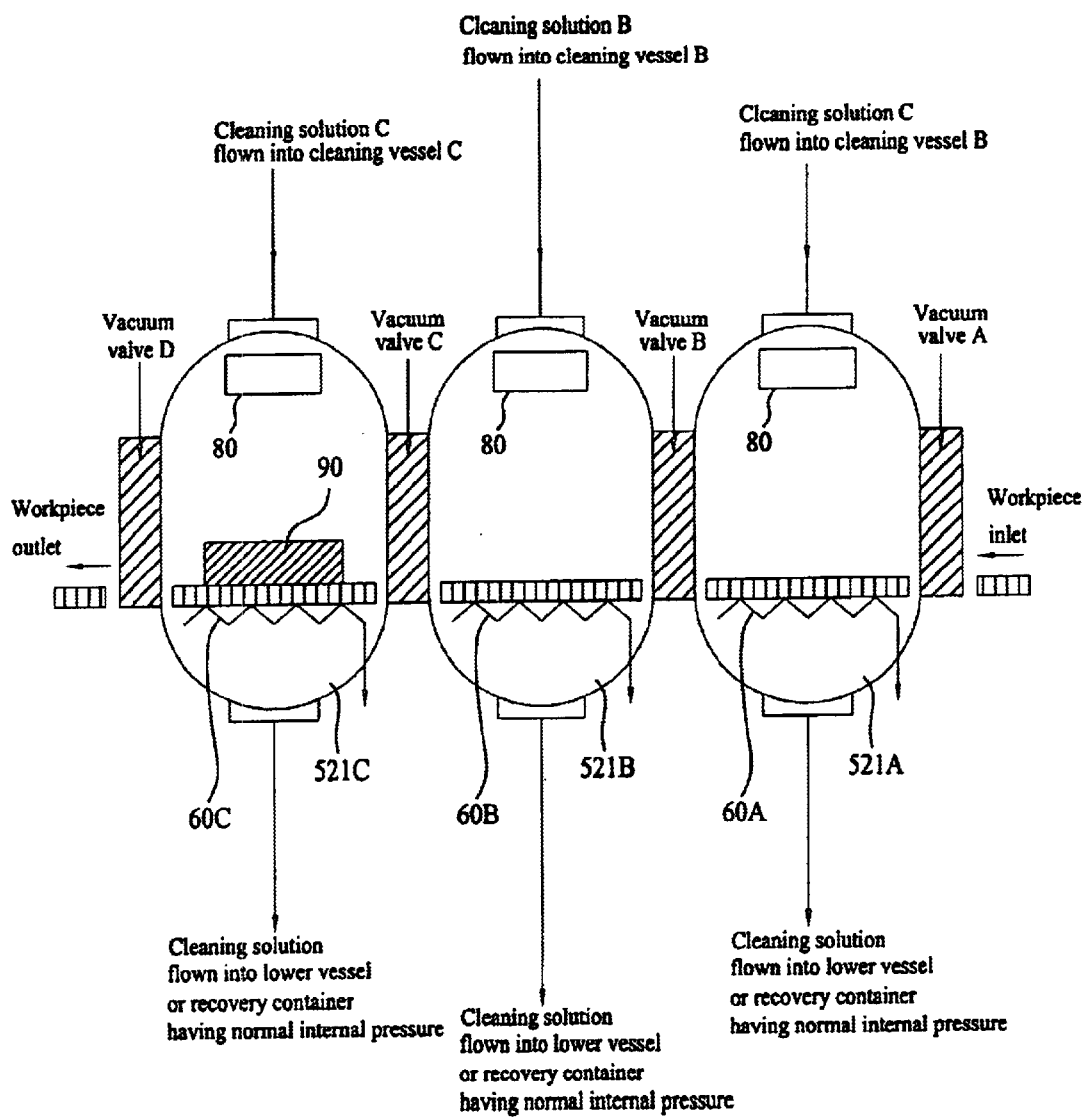
FIG. 8 is a conceptual diagram showing the method of performing vacuum freeze drying on the serial multi-vessel cleaning and vacuum drying apparatus of the present invention.

Please refer to FIG. 8 that is a conceptual diagram showing the serial multi-vessel cleaning and vacuum drying apparatus of the present invention and the method of performing vacuum freeze drying on the serial multi-vessel cleaning and vacuum drying apparatus. Wherein, low-dissolved-air cleaning solution and the drain-to-vacuum process are used to produce vacuum in every cleaning vessel, and pre-freezing and condensing sublimated vapors are alternately implemented to control temperatures for drying a workpiece 90. As shown in FIG. 8, three cleaning vessels 521A, 521B, and 521C are serially connected via vacuum valves A, B, C and D, and provided with heat control units 60A, 60B, and 60C, respectively, and heat egress units 80. The first cleaning vessel 521A is used to pre-freeze the cleaned workpiece 90 to be dried, the second cleaning vessel 521B is used to perform the vacuum freeze drying, and the third cleaning vessel 521C is used to output the dried workpiece 90.

The method of performing the vacuum freeze drying with the serial multi-vessel cleaning and vacuum drying apparatus of the present invention includes the following steps:

1. Clean the workpiece 90 to be dried in the first cleaning vessel 521A, actuate the heat control unit 60A under normal pressure to pre-freeze the workpiece 90 to be dried, and use low-temperature and low-dissolved-air cleaning solution and the drain-to-vacuum process to produce vacuum in the first cleaning vessel 521A;
2. Open the vacuum valve B for the workpiece 90 to be dried to enter the vacuumized second cleaning vessel 521B, and shut the vacuum valve B to perform the vacuum freeze drying in the second cleaning vessel 521B; and
3. When the workpiece 90 is fully dried, open the vacuum valve C to transfer the dried workpiece 90 to the third vacuumized cleaning vessel 521C, shut the vacuum valve C, output the dried workpiece 90 after the third cleaning vessel 521C is returned to the normal internal pressure, and use the low-dissolved-air cleaning solution and the drain-to-vacuum process to produce vacuum in the third cleaning vessel 521C.

Figure 9:
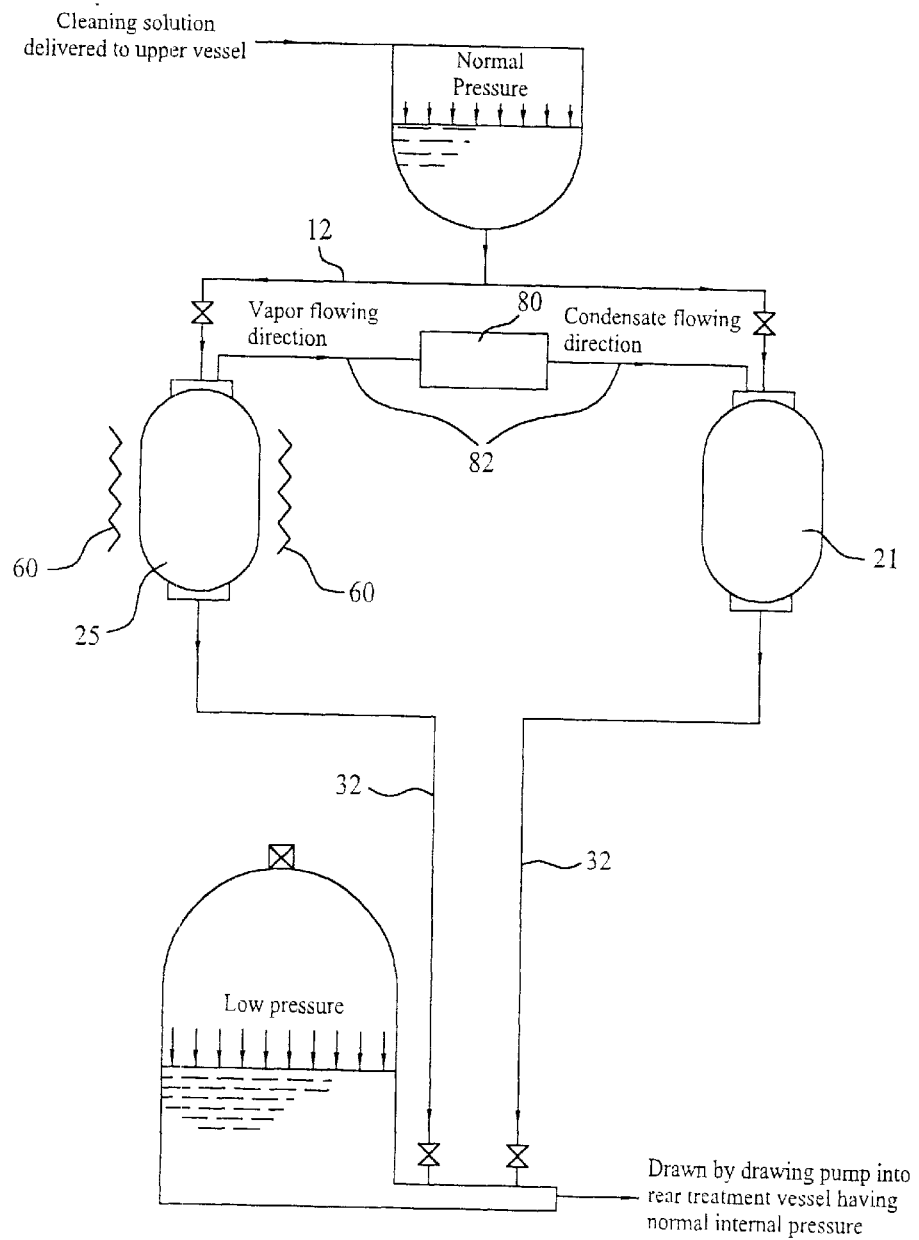
FIG. 9 is a conceptual diagram showing the method of producing a medium vacuum vessel on a part of the cleaning and vacuum drying apparatus of the present invention.

Please refer to FIG. 9 that is a conceptual diagram showing the method of producing a medium vacuum vessel on a part of the cleaning and vacuum drying apparatus of the present invention. Wherein, low-dissolved-air cleaning solution and the drain-to-vacuum process are employed to produce vacuum in two cleaning vessels, and the physical features that boiling points of general liquids lower with reduced pressure, that liquid saturated vapor pressure reduces with lowered temperature, and that two vacuum vessels of different working temperatures would have a pressure differential between their saturated vapor pressures are employed to produce the medium vacuum vessel.

As shown in FIG. 9, one of the two vacuumized cleaning vessel is a vacuum vessel 25 that can be detached from an upper-vessel pipe 12 and a lower-vessel pipe 32 connected thereto to form an independent vacuum vessel 25. The vacuum vessel 25 is externally provided with heat control units 60 to provide a desired temperature depending on a degree of vacuum to be produced in the vacuum vessel 25. The vacuum vessel 25 is connected to another cleaning vessel 21 via a condensate pipe 82. A heat egress unit 80 is provided on the condensate pipe 82 at a predetermined position near a middle section thereof for condensing vapors into liquid. The heat control units 60 have a working temperature on the gas-liquid equilibrium curve of the cleaning solution, and the vacuum vessel 25 has a working temperature higher than that of the cleaning vessel 21.

The method of producing the medium vacuum vessel with the cleaning and vacuum drying apparatus of the present invention includes the following steps:
1. Set the drain-to-vacuum apparatus of the vacuum vessel 25 and the cleaning vessel 21 to its initial state by using the low-dissolved-air cleaning solution and the drain-to-vacuum process to produce vacuum in the two vessels;
2. Use the heat control units 60 to vaporize the cleaning solution left in the vacuum vessel 25 and to further heat vapors produced in the vacuum vessel 25 to dry vapors. Since the temperature difference between the cleaning vessel 21 and the vacuum vessel 25 results in a pressure differential, the vaporized gas is caused to diffuse from the vacuum vessel 25 toward the condensate pipe 82 and the heat egress unit 80 and be condensed into the clean and low-temperature cleaning solution that flows into the cleaning vessel 21 and is recovered; and
3. When the internal pressure of the vacuum vessel 25 does not rise any longer, detach the vacuum vessel 25 from its drain-to-vacuum apparatus and the condensate pipe 82, and allow the vacuum vessel 25 to cool, so that a medium vacuum is produced in the vacuum vessel 25.

Figure 10:
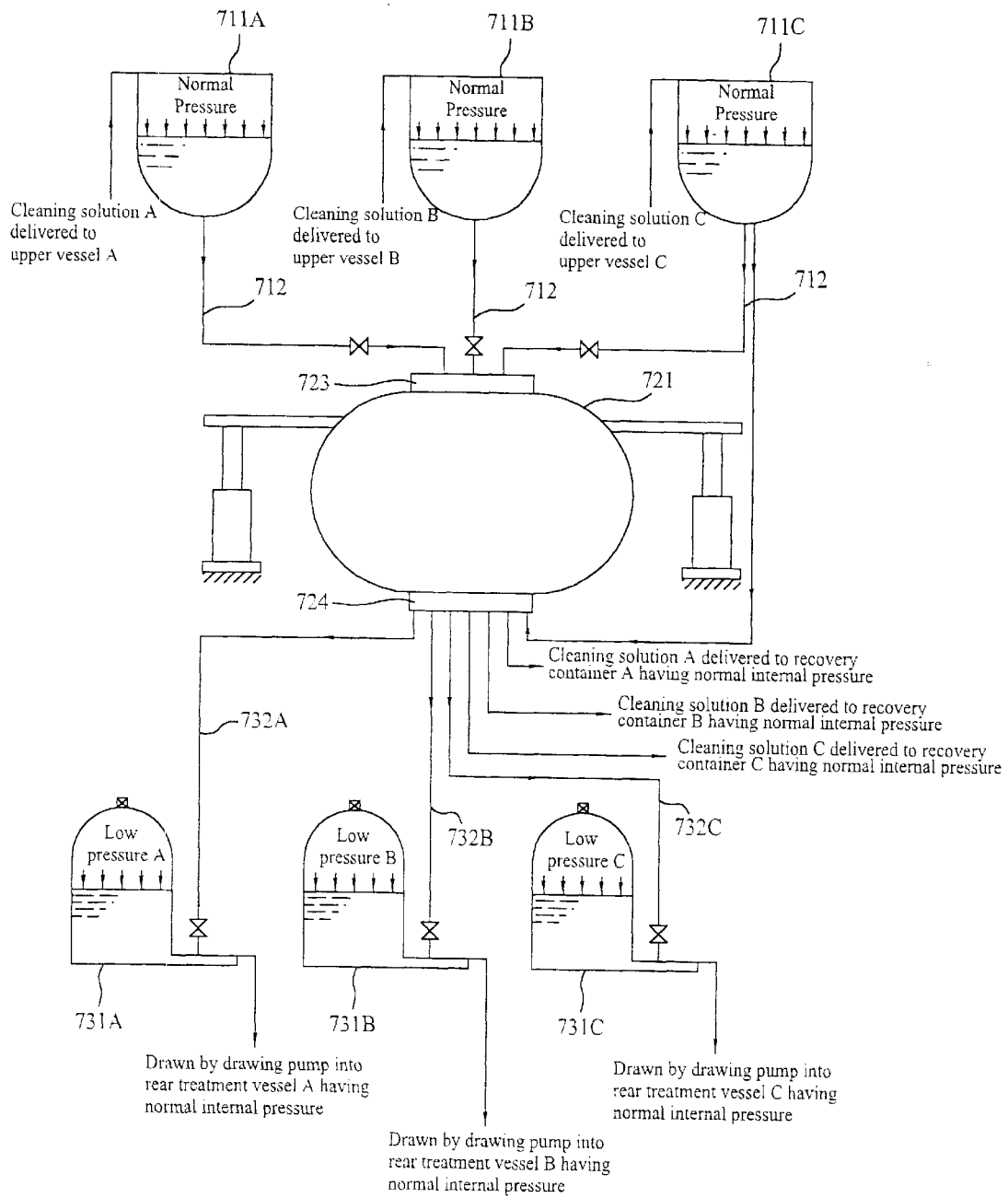
FIG. 10 is a conceptual diagram showing the method of using multiple types of cleaning solutions and gases to perform dry and wet cleans on the cleaning and vacuum drying apparatus of the present invention.

Please refer to FIG. 10 that is a conceptual diagram showing the present invention is employed to perform dry and wet cleans with multiple types of cleaning solutions A, B, and C. When a workpiece in the cleaning vessel must be continuously treated with more than one type of cleaning solution, corresponding upper vessel and lower vessel are provided in the apparatus for each type of cleaning solution. Each upper vessel stores a specific type of cleaning solution that is supplied to the cleaning vessel according to the preset cleaning procedures to clean the workpiece. The drain-to-vacuum process is employed to produce vacuum in the cleaning vessel. The cleaning solutions are caused to flow into their respective corresponding lower vessels or be directly drained into their respective corresponding recovery containers having normal internal pressure. In the embodiment shown in FIG. 10, there are three upper vessels 711A, 711B, and 711C connected to an upper-flow control unit 723 of a cleaning vessel 721 via corresponding upper-vessel pipes 712, and three lower vessels 731A, 731B, and 731C connected to a lower-flow control unit 724 of the cleaning vessel 721 via corresponding lower-vessel pipes 732A, 732B, and 732C. The upper-flow control unit 723 of the cleaning vessel 721 is provided with an intake valve 634 for the cleaning vessel 721 to return to normal pressure. The lower-flow control unit 724 of the cleaning vessel 721 is provided with a plurality of valves to communicate the cleaning vessel 721 with a plurality of recovery containers A, B, and C having normal internal pressure, so that different types of cleaning solutions are recovered and stored in their respective recovery containers.

The apparatus of FIG. 10 may be considered as a combination of several drain-to-vacuum apparatus. After data about the specific gravity of each type of cleaning solution and the volume of each lower vessel 731A, 731B, 731C are obtained, each type of the cleaning solutions can be set to its initial state through the same steps as those for setting the drain-to-vacuum apparatus to its initial state.

The method of setting the apparatus of FIG. 10 to its initial state includes the following steps:
1. Use the drain-to-vacuum process to produce vacuum in the cleaning vessel 721 according to actual needs and procedures in performing the cleaning operation, and allow the cleaning solutions A, b, C to flow from the vacuumized cleaning vessel 721 into the lower vessels 731A, 731B, 731C, respectively; and
2. Use drawing pumps to draw surplus cleaning solutions from the lower vessels 731A, 731B, 731C into their respective corresponding normal-pressure rear treatment vessels A, B, C, so that pressures at liquid surfaces of the lower vessels 731A, 731B, 731C return to the pressure values initially set for them.

Methods of performing other operations on the apparatus of FIG. 10 are the same as those having been described above in different paragraphs.

Figure 11:
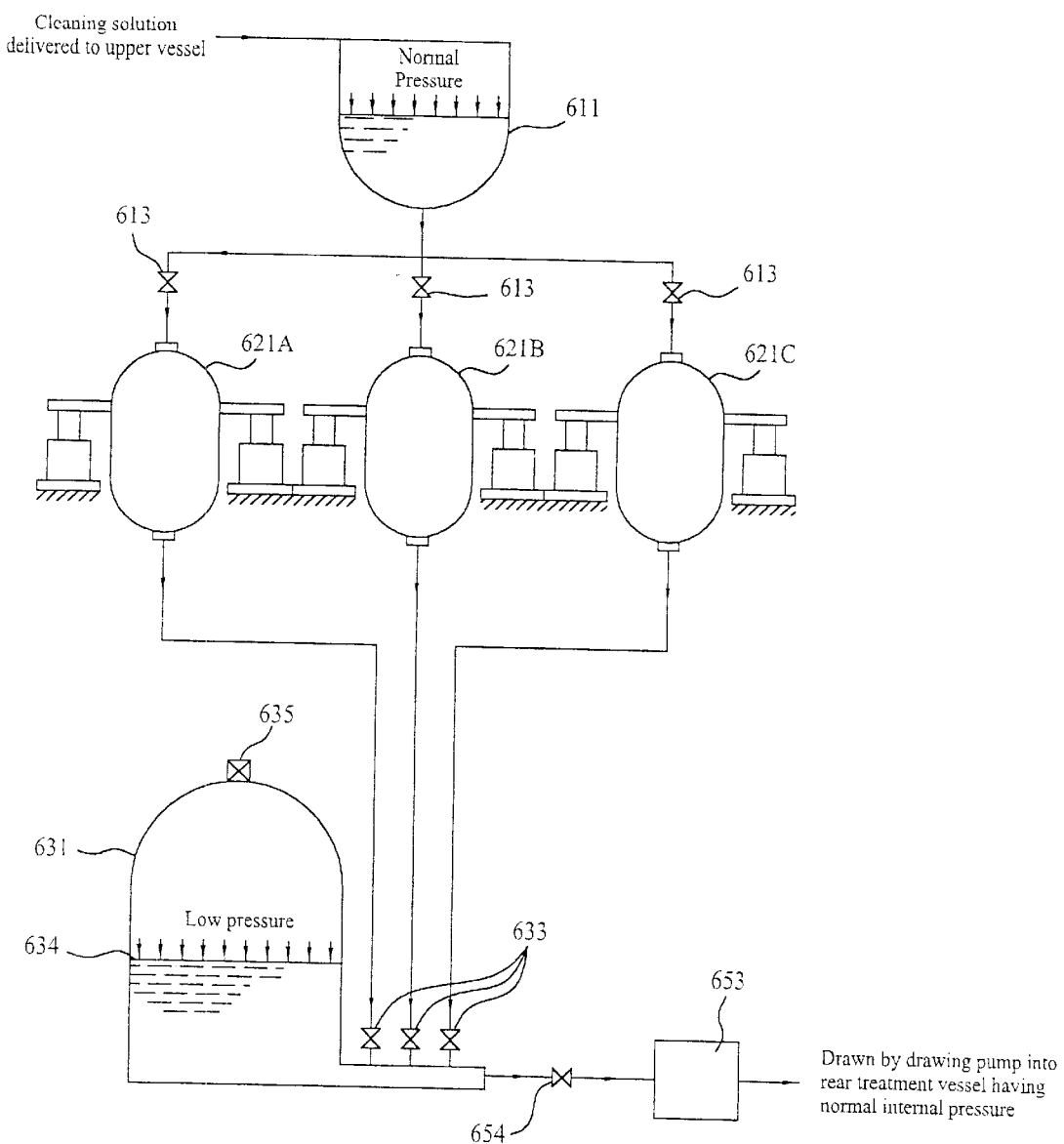
FIG. 11 is a conceptual diagram showing the present invention includes multiple working vessels that are connected to a common upper vessel and a common lower vessel.

Please refer to FIG. 11 that is a conceptual diagram showing the present invention includes multiple working vessels that are connected to a common upper vessel and a common lower vessel. The embodiment shown in FIG. 11 includes an upper vessel 611, three cleaning vessels 621A, 621B, 621C, and a lower vessel 631. The cleaning vessels 621A, 621B, 621C may have different volumes from one another. The upper vessel 611 and the lower vessel 631 are connected to each of the cleaning vessels 621A, 621B, 621C in a manner that allows them to work as three independent drain-to-vacuum apparatus.

The apparatus of FIG. 11 can be set to an initial state through the following procedures:
1. Obtain data about the specific gravity of each type of the cleaning solutions, the volume of each of the cleaning vessels 621A, 621B, 621C, and the volume of the lower vessel 631; set the relative height difference to be existed between the biggest cleaning vessel and the lower level; calculate the pressure at the liquid surface in the lower vessel 631; and use the obtained pressure at the liquid surface in the lower vessel 631 to calculate relative heights between the lower level and another two cleaning vessels;
2. Supply the cleaning solution to the lower vessel 631 by setting the pump valve 654 to ON, the exhaust valve 635 to ON, and the lower-vessel valve 633 to ON, starting the drawing pump 653 to draw the cleaning solution from the rear treatment vessel into the lower vessel 631 until a predetermined liquid level is reached in the lower vessel 631, and then setting the exhaust valve 635 to OFF;
3. Supply the cleaning solution to the upper vessel 611 by setting all upper-vessel valves 613 to OFF, filling the upper vessel 111 with the cleaning solution, and keeping the supply of the cleaning solution to maintain a liquid surface in the upper vessel 111 at a predetermined height;
4. Regulate the pressure at the liquid surface 634 in the lower vessel 631 by setting all lower-vessel valves 633 to OFF, and starting the drawing pump 653 to draw the cleaning solution from the lower vessel 631 into the rear treatment vessel having normal internal pressure. The pressure at the liquid surface 634 in the lower vessel 631 decreases with the lowered liquid surface 634. When the pressure at the liquid surface 634 in the lower vessel 631 reaches the preset pressure, set the drawing pump 653 to OFF and the pump valve 654 to OFF; and 5. Actuate the elevating mechanisms to adjust the relative height difference between the lower level and each cleaning vessel 621A, 621B, 621C.

Depending on actual needs and procedures in the operation to be performed, use the drain-to-vacuum process to produce vacuum in each cleaning vessel 621A, 621B and 621C. After the cleaning vessels are vacuumized, the cleaning solution flows from the three vacuumized cleaning vessels into the lower vessel 631. Use the drawing pump 653 to draw surplus cleaning solution from the lower vessel 631 into the rear treatment vessel on a time-sharing basis, so that the pressure at the liquid surface 634 in the lower vessel 631 returns to the initially set pressure.

In brief, the present invention provides a cleaning and vacuum drying apparatus including one or more sets of drain-to-vacuum apparatus, one or more vacuum vessels created by the drain-to-vacuum apparatus, one or more heat control units for vaporizing or sublimating cleaning solution, one or more heat egress units for condensing vapors, and other auxiliary means, such as a plurality of connection pipes. By using the low-dissolved-air cleaning solution and the drain-to-vacuum process on the drain-to-vacuum apparatus, each cleaning vessel included in the apparatus could become a vacuumized cleaning vessel having very low air pressure and vapor pressure from the cleaning solution in its volume that is not filled with the cleaning solution. The present invention also uses the physical features that boiling points of general liquids lower with reduced pressure, that liquid saturated vapor pressure reduces with lowered temperature, and that two vacuum vessels of different working temperatures would have a pressure differential between their saturated vapor pressures, so that the enclosed cleaning vessel that has completed dry or wet clean therein could be directly used to perform vacuum heat drying, vacuum freeze drying, or other operations. Thus, different operations, including wet clean, dry clean, vacuum heat drying, and vacuum freeze drying, could be performed in one process, and the low-pressure gas used in the dry clean and the cleaning solution and waste solution can be recovered.

It is understood the present invention has been described with some embodiments thereof and many changes and modifications in the described embodiments can be carried out without departing from the scope and the spirit of the invention that is intended to be limited only by the appended claims.

The method and apparatus of the present invention for performing multiple cleaning and vacuum drying operations in enclosed vessels has the following advantages as compared with other methods and apparatus known in the prior art:

1. The present invention uses a general drawing pump to reduce internal pressure of the sealed lower vessel to increase the degree of vacuum in the cleaning vessel instead of using a vacuum system. This enables effective reduction of costs for the method and the apparatus of the present invention.
2. The present invention uses the drain-to-vacuum process to effectively link (1) the wet clean and the vacuum heat drying, (2) the wet clean and the vacuum freeze drying, and (3) the wet clean and the dry clean, and uses heat control unit and heat egress unit to effectively carry out the producing and recovering of low-dissolved-air cleaning solution, the vacuum heat drying, the vacuum freeze drying, the recovery of the cleaning solution used in wet clean and the waste solution thereof, and the producing of medium vacuum vessel to recover low-pressure gas used in dry clean to achieve environment protection.
3. After using the drain-to-vacuum process to produce vacuum in the cleaning vessel, the present invention utilizes the physical feature that boiling points of general liquids lower with reduced pressure, so that low-temperature heat energy or waste heat may be introduced in performing the vacuum heat drying, recovering the cleaning solution and waste solution, and producing medium vacuum vessel to achieve energy saving.
4. The present invention implements the drain-to-vacuum process to produce vacuum in the cleaning vessel for the same to form vacuumized cleaning vessel containing very low internal air pressure and vapor pressure from the cleaning solution, and uses the heat control unit to introduce low temperature heat source to vaporize the cleaning solution and other liquids in the vacuumized cleaning vessel, and then uses the heat egress unit and the principle of pressure differential to condense the vaporized cleaning solution or other vapors into liquid that is then recovered and stored in the vacuum vessel, so that operations of vacuum heat drying, recovering cleaning solution and waste solution, and producing medium vacuum vessel can be performed at effectively reduced manufacturing and equipment costs.
5. The present invention uses the low-dissolved-air cleaning solution and the drain-to-vacuum process to produce vacuum in the cleaning vessel for the same to form a vacuumized cleaning vessel having only vapor pressure from the cleaning solution, and uses the heat control unit to control the temperature of the workpiece to be dried and the heat egress unit to control the internal pressure of the vacuumized cleaning vessel, so that the vacuum freeze drying can be effectively performed at reduced manufacturing and equipment costs.

What is claimed is:

1. A method for performing multiple cleaning and vacuum drying operations, including wet clean, dry clean, vacuum heat drying, and vacuum freeze drying, in enclosed vessels in one process without using a vacuum system, and capable of recovering low-pressure gas used in said operation of dry clean and recovering cleaning solution and waste solution to achieve environment protection and energy savings, comprising the steps of:

providing a cleaning and vacuum drying apparatus or a serial multi-vessel cleaning and vacuum drying apparatus that includes at least one drain-to-vacuum apparatus, at least one vacuum vessel produced from said at least one drain-to-vacuum apparatus, at least one heat control unit for vaporizing or sublimating a type of cleaning solution, at least one heat egress unit for condensing vapors of said cleaning solution, and a plurality of connection pipes and vacuum valves;

using a low-dissolved-air cleaning solution and a drain-to-vacuum process on said at least one drain-to-vacuum apparatus for said cleaning vessel to become a vacuumized cleaning vessel that contains very low internal air pressure and vapor pressure from said cleaning solution in a part of a volume of said cleaning vessel that is not filled with said cleaning solution, so that influence of air pressure on said operations being performed on said cleaning and vacuum drying apparatus is minimized; and utilizing the physical features that boiling points of general liquids lower with reduced pressure, that liquid saturated vapor pressure reduces with lowered temperature, and that two vacuum vessels of different working temperatures would have a pressure differential between their saturated vapor pressures, and using said at least one heat control unit and said at least one heat egress unit, such that said enclosed cleaning vessel having completed said operations of dry clean and wet clean therein could be directly used to perform said operations of vacuum heat drying and vacuum freeze drying, to produce a medium vacuum vessel, to recover said low-pressure gas used in said dry clean, and to recover said cleaning solution and waste solution.

2. The method as claimed in claim 1, wherein each of said at least one drain-to-vacuum apparatus includes a cleaning vessel, a lower vessel located below said cleaning vessel with a height difference existing between them, and a valve-equipped link pipe extended between said cleaning vessel and said lower vessel to communicate them with one another; and both said cleaning vessel and said lower vessel being enclosed vessels that can be sealed in a predetermined manner;

said cleaning vessel being provided auxiliary means depending on actual needs;

said lower vessel having a big volume and a large cross-section area at a liquid surface and being partially filled with said cleaning solution; and said lower vessel having internal pressure that is set according to said height difference between said cleaning vessel and said lower vessel, a specific gravity of said cleaning solution, a volume of said cleaning vessel, and the volume of said lower vessel, and is lower than a normal pressure to enable full draining of said cleaning solution from said cleaning vessel into said lower vessel; and said lower vessel being provided with a drawing pump for drawing said cleaning solution from said lower vessel into a recovery container having normal internal pressure or a rear treatment vessel and drawing said cleaning solution from said recovery container or said rear treatment vessel to said lower vessel and thereby regulating height of and pressure at the liquid surface in said lower vessel.

3. The method as claimed in claim 1, wherein the number of said at least one drain-to-vacuum apparatus is two, and said cleaning vessel of a first one of said two drain-to-vacuum apparatus being connected to and communicated with said cleaning vessel of a second one of said two drain-to-vacuum apparatus via a first pipe, and said at least one heat egress unit being provided on said first pipe at a predetermined position for condensing vapors of said cleaning solution into liquid;

said cleaning vessels of said two drain-to-vacuum apparatus being connected to said at least one vacuum vessel produced by said drain-to-vacuum apparatus via second pipes, and said at least one heat egress unit also being mounted on said second pipes at predetermined positions for condensing vapors of said cleaning solution into liquid;

said at least one heat egress unit also being mounted in said cleaning vessels of said two drain-to-vacuum apparatus for condensing said cleaning solution in a gaseous state in said cleaning vessels into a liquid or solid state; and said at least one heat control unit being mounted in said cleaning vessels of said two drain-to-vacuum apparatus for vaporizing said cleaning solution in liquid state in said cleaning vessels or sublimating said cleaning solution in solid state in said cleaning vessels.

4. The method as claimed in claim 1, wherein said drain-to-vacuum process includes the steps of:

a. Setting said at least one drain-to-vacuum apparatus to an initial state thereof or to a final state of any one of said operations;

b. Filling said cleaning vessel with said cleaning solution and then sealing said cleaning vessel;

c. Producing vacuum in said cleaning vessel by opening said valve on said link pipe and admitting said cleaning solution in said cleaning vessel into said lower vessel that is in a sealed state; wherein a height of said cleaning solution in a still state is the height of cleaning solution of the same specific gravity that could be maintained under liquid surface pressure in said sealed lower vessel;

d. Draining an extra amount of said cleaning solution out of said sealed lower vessel and reducing said liquid surface pressure therein by shutting said valve on said link pipe, starting said drawing pump to draw said cleaning solution from said lower vessel into said recovery container or said rear treatment vessel until said liquid surface pressure in said lower vessel reaches a preset pressure, and then shutting said drawing pump and sealing said lower vessel; and e. Returning to step (c) until the still height of the cleaning solution reaches an actually required height.

5. The method as claimed in claim 4, wherein said initial state of said drain-to-vacuum apparatus is set through the steps of:

a. Obtaining data about the specific gravity of said cleaning solution, the volume of said cleaning vessel, and the volume of said lower vessel; setting said height difference between said cleaning vessel and said lower vessel; and calculating said liquid surface pressure in said lower vessel;

b. Supplying said cleaning solution to said lower vessel by opening said valve on said link pipe, starting said drawing pump to draw said cleaning solution from said recovery container or said rear treatment vessel into said lower vessel, that currently has a normal internal pressure, until a predetermined liquid level is reached in said lower vessel, and shutting said valve on said link pipe to seal said lower vessel;

c. Regulating said liquid surface pressure in said lower vessel by starting said drawing pump to draw said cleaning solution from said sealed lower vessel into said recovery container or said rear treatment vessel, and shutting said drawing pump when said liquid surface pressure in said sealed lower vessel reaches said preset pressure; and d. Adjusting said height difference between said cleaning vessel and said lower vessel.

6. The method as claimed in claim 1, wherein said operation of wet clean and said operation of vacuum heat drying are linked through the steps of: completing said operation of wet clean, and then implementing said drain-to-vacuum process to produce vacuum in said cleaning vessel, and then performing said operation of vacuum heat drying in the vacuumized cleaning vessel.

7. The method as claimed in claim 1, wherein said operation of wet clean and said operation of vacuum freeze drying are linked through the steps of: completing said operation of wet clean, and then using said low-dissolved-air cleaning solution and said drain-to-vacuum process to produce vacuum in said cleaning vessel, and then performing said operation of vacuum freeze drying in the vacuumized cleaning vessel.

8. The method as claimed in claim 1, wherein said operation of wet clean and said operation of dry clean are linked through the steps of: completing said operation of wet clean, and then implementing said drain-to-vacuum process to produce vacuum in said cleaning vessel, and then performing said operation of dry clean in the vacuumized cleaning vessel.

9. The method as claimed in claim 1, wherein said operation of dry clean and said recovering of low-pressure gas used in said dry clean are implemented through the steps of:
 a. Producing vacuum in said cleaning vessel by implementing said drain-to-vacuum process or performing any one of said operations that has a final state also producing vacuum (in said cleaning vessel;
 b. Filling said vacuumized cleaning vessel obtained in step (a) with gas used for said dry clean, so that said cleaning vessel becomes a low-pressure vessel filled up with said gas; and
 c. After completion of said operation of dry clean, upward introducing said cleaning solution into said cleaning vessel from a bottom thereof to raise a liquid surface in said cleaning vessel and thereby exhaust said low-pressure gas from said cleaning vessel to one of said at least one vacuum vessel connected, so that said low-pressure gas is completely recovered.

10. The method as claimed in claim 1, wherein said low-dissolved-air cleaning solution is produced through the steps of:
 a. Setting liquid surface pressure for said lower vessel, so that the liquid level of said cleaning solution becomes still in said cleaning vessel and covers said heat control unit provided in said cleaning vessel;
 b. Implementing said drain-to-vacuum process to produce vacuum in apart of volume of said cleaning vessel;
 c. Using said heat control unit to heat said cleaning solution in said cleaning vessel for said liquid surface in said cleaning vessel to boil; keeping heating said cleaning solution until the pressure in said cleaning vessel does not rise any further; and
 d. Returning said cleaning vessel to normal pressure by draining said low-dissolved-air cleaning solution into a recovery container having normal internal pressure connected to said cleaning vessel.

11. The method as claimed in claim 1, wherein said operation of vacuum heat drying is performed through the steps of:
 a. Producing vacuum in said cleaning vessel by implementing said drain-to-vacuum process or performing any one of said operations that has a final state also producing vacuum in said cleaning vessel; and
 b. Using said heat control unit to supply heat, so that said cleaning solution left on a workpiece to be dried in said cleaning vessel absorbs heat supplied by said heat control unit and becomes vaporized; since a temperature difference between said cleaning vessel and said vacuum vessel resulting in saturated vapor pressure differential, said vaporized cleaning solution in said cleaning vessel being caused to flow toward a heat egress unit connected to one of said at least one vacuum vessel and be condensed into clean and low-temperature cleaning solution that flows into said vacuum vessel and is recovered; and
 c. Continuing recovering said clean and low-temperature cleaning solution until the pressure in said cleaning vessel does not rise any further.

12. The method as claimed in claim 1, wherein said operation of vacuum freeze drying is performed through the steps of:
 a. Producing vacuum in said cleaning vessel by implementing said drain-to-vacuum process or performing any one of said operations that has a final state also producing vacuum in said cleaning vessel; and
 b. Using said heat control unit to control a temperature of a workpiece to be dried in said cleaning vessel and lower said temperature to a point lower than the lowest eutectic point of compositions of said workpiece; using said heat egress unit to control the pressure in said vacuumized cleaning vessel obtained in step (a) and to supply heat of vaporization to vaporize said cleaning solution left in said vacuumized cleaning vessel, so that a vapor pressure in said cleaning vessel is larger than a saturated vapor pressure at a temperature set for said heat control unit; and
 c. When the workpiece to be dried reaching a temperature lower than the lowest eutectic point of the compositions thereof, setting a sublimation temperature for said heat control unit for the same to provide sublimation heat to sublimate said cleaning solution in solid state in the workpiece to be dried, and using said heat egress unit to condense vapors of said cleaning solution produced in the course of sublimation into said solid-state cleaning solution again, so that internal pressure of said cleaning vessel is kept below a saturated vapor pressure at said sublimation temperature; and
 d. Continuing the above procedures until the pressure in said cleaning vessel does not rise any further.

13. The method as claimed in claim 1, wherein said recovering of cleaning solution and waste solution is performed through the steps of:
 a. Using a first one of said at least one cleaning vessel as a vaporization vessel for vaporizing said cleaning solution or said waste solution, and a second one of said at least one cleaning vessel as a recovery vessel for recovering clean cleaning solution and solution;
 b. Setting liquid surface pressure for said lower vessel connected to said vaporization vessel, so that a height of said cleaning solution or said waste solution becomes still in said vaporization vessel and covers a heat control unit provided therein; and setting liquid surface pressure for said lower vessel connected to said recovery vessel, so that said whole recovery vessel can become a vacuum vessel;
 c. Using said cleaning solution or said waste solution to be recovered and said drain-to-vacuum process on said drain-to-vacuum apparatus of said vaporization vessel to produce vacuum in a part of volume of said vaporization vessel; and using clean and low-temperature cleaning solution or solution and said drain-to-vacuum process on said drain-to-vacuum apparatus of said recovery vessel for said whole recovery vessel to become a vacuum vessel;
 d. Using a heat control unit in said vaporization vessel to heat said cleaning solution or said waste solution that is in said vaporization vessel to be recovered, so that said cleaning solution or said waste solution to be recovered absorbs heat of vaporization and is vaporized; and since a temperature difference between said recovery vessel and said vaporization vessel resulting in saturated vapor pressure differential, said vaporized cleaning solution in said vaporization vessel being caused to flow toward a heat egress unit connected to said recovery vessel and be condensed into clean cleaning solution or solution that flows into said recovery vessel.

14. The method as claimed in claim 1, wherein said medium vacuum vessel is produced through the steps of:
   a. Using a first one of said at least one cleaning vessel as a vacuum vessel and a second one of said at least one cleaning vessel as a recovery cleaning vessel, wherein said vacuum vessel is detachable from said drain-to-vacuum apparatus;
   b. Producing vacuum in said vacuum vessel and said recovery cleaning vessel by implementing said drain-to-vacuum process;
   c. Using a heat control unit in said vacuum vessel to vaporize said cleaning solution left in said vacuum vessel, and heating vapors produced in said vacuum vessel to be dry vapors; since a temperature difference between said vacuum vessel and said recovery cleaning vessel resulting in saturated vapor pressure differential, said vaporized cleaning solution in said vacuum vessel being caused to flow toward a heat egress unit connected to said recovery cleaning vessel and be condensed into clean cleaning solution that flows into said recovery cleaning vessel; and
   d. When internal pressure of said vacuum vessel does not increase any further, sealing and detaching said vacuum vessel from said drain-to-vacuum apparatus, and allowing said detached vacuum vessel to cool, so that a medium vacuum is produced in said vacuum vessel.

15. The method as claimed in claim 1, wherein said serial multi-vessel cleaning and vacuum drying apparatus includes a plurality of cleaning vessels being serially connected to one another via a plurality of vacuum valves, and a conveyer for transferring a workpiece through said plurality of cleaning vessels.

16. The method as claimed in claim 1, wherein said operation of vacuum freeze drying is performed on said serial multi-vessel cleaning and vacuum drying apparatus through the steps of:
   a. Setting a second and a third one of said plurality of cleaning vessels to an initial state by using said low-dissolved-air cleaning solution and said drain-to-vacuum process on said second and said third cleaning vessel to produce vacuum therein, so that said second and said third cleaning vessel become vacuumized cleaning vessels;
   b. Admitting workpiece to be dried into a first one of said plurality of cleaning vessels, and actuating a heat control unit in said first cleaning vessel at normal pressure, so that said workpiece to be dried is pre-frozen; using low-temperature and low-dissolved-air cleaning solution and said drain-to-vacuum process to produce vacuum in said first cleaning vessel; opening a second one of said plurality of vacuum valves located between said first and said second cleaning vessels to transfer said workpiece to be dried from said first into said second vacuumized cleaning vessel; and then shutting said second vacuum valve;
   c. Performing said operation of vacuum freeze drying for said workpiece to be dried in said second vacuumized cleaning vessel; after completion of said operation of vacuum freeze drying, opening a third one of said plurality of vacuum valves located between said second and said third vacuumized cleaning vessels, so that said dried workpiece is transferred from said second into said third vacuumized cleaning vessel; and then shutting said third vacuum valve; and
   d. Returning said third vacuumized cleaning vessel to normal internal pressure and moving said dried workpiece out of said third cleaning vessel; and using said low-dissolved-air cleaning solution and said drain-to-vacuum process to produce vacuum in said third cleaning vessel, so that said third cleaning vessel becomes a vacuumized vessel again.

17. The method as claimed in claim 12, further comprising the following steps before performing said operation of vacuum freeze drying: actuating said heat control unit under normal pressure to pre-freeze said workpiece to be dried, so that liquid in said workpiece to be dried has an increased crystal size after being frozen, and using low-temperature and low-dissolved-air cleaning solution and said drain-to-vacuum process to produce vacuum in said cleaning vessel.

18. The method as claimed in claim 10, wherein said heat control unit has a temperature range on a gas-liquid equilibrium curve of said cleaning solution being used in said method, and said heat control unit may introduce low-temperature heat energy or waste heat.

19. The method as claimed in claim 11, wherein said heat control unit has a temperature range on a gas-liquid equilibrium curve of said cleaning solution being used in said method, and said heat control unit may introduce low-temperature heat energy or waste heat.

20. The method as claimed in claim 13, wherein said heat control unit has a temperature range on a gas-liquid equilibrium curve of said cleaning solution being used in said method, and said heat control unit may introduce low-temperature heat energy or waste heat.

21. The method as claimed in claim 14, wherein said heat control unit has a temperature range on a gas-liquid equilibrium curve of said cleaning solution being used in said method, and said heat control unit may introduce low-temperature heat energy or waste heat.

22. The method as claimed in claim 12, wherein said heat control unit and said heat egress unit have temperature ranges on a gas-solid equilibrium curve of said cleaning solution being used in said method.

23. The method as claimed in claim 16, wherein said heat control unit and said heat egress unit have temperature ranges on a gas-solid equilibrium curve of said cleaning solution being used in said method.

24. The method as claimed in claim 10, wherein said cleaning vessel is a vessel having increased cross-section area at liquid surface therein to provide increased area of vaporization.

25. The method as claimed in claim 11, wherein said cleaning vessel has a working temperature higher than that of said vacuum vessel.

26. The method as claimed in claim 14, wherein said vacuum vessel has a working temperature higher than that of said recovery cleaning vessel.

27. The method as claimed in claim 13, wherein said vaporization vessel has a working temperature higher than that of said recovery vessel.

28. The method as claimed in claim 13, wherein a step of producing said low-dissolved-air cleaning solution is implemented before said step (a) to remove air dissolved in said cleaning solution or said waste solution to be recovered.

29. The method as claimed in claim 13, wherein when said recovery vessel is saturated and said condensed clean and low-temperature cleaning solution or solution stops flowing into said recovery vessel, said recovery vessel returns to normal pressure and said clean cleaning solution or solution in said recovery vessel is drained into a recovery container having normal internal pressure connected to said recovery vessel; and said fully drained clean cleaning solution or solution and said drain-to-vacuum process being used to produce vacuum in said recovery vessel, so that said whole recovery vessel becomes a vacuum vessel to facilitate subsequent recovery of said cleaning solution and solution.

30. The method as claimed in claim 13, wherein said vaporization vessel is timely replenished with said cleaning solution or said waste solution to be recovered in the course of vaporization, so as to maintain said liquid surface height in said vaporization vessel.

31. The method as claimed in claim 12, wherein said heat egress unit for performing said operation of vacuum freeze drying is provided with means for speeding up flowing of said gaseous cleaning solution, in order to obtain an increased rate of drying.

32. The method as claimed in claim 16, wherein said heat egress unit for performing said operation of vacuum freeze drying is provided with means for speeding up flowing of said gaseous cleaning solution, in order to obtain an increased rate of drying.

33. A drain-to-vacuum apparatus on which a drain-to-vacuum process is implemented to produce vacuum in a cleaning vessel or a vacuum vessel, comprising:

a work platform that is generally divided into three levels, namely, upper level, middle level, and lower level; said upper and said lower levels being set to have a fixed height difference between them, and said middle level including an elevating mechanism for adjusting a height of said middle level relative to said lower level;

an upper vessel that is provided on said upper level of said work platform at a predetermined position for receiving and storing a type of clean cleaning solution therein; said upper vessel being connected at a predetermined position of its bottom to a first end of an upper-vessel pipe, via which said cleaning solution in said upper vessel flows toward a cleaning vessel; an exhausting pipe being led from a predetermined position on the bottom of said upper vessel to a bottom of said cleaning vessel depending on actual need, so that said cleaning solution in said upper vessel may be introduced into said cleaning vessel via said exhausting pipe to exhaust gas existing in said cleaning vessel;

a second end of said upper-vessel pipe being connected to an upper-flow control unit, via which said cleaning solution in said upper vessel flows into said cleaning vessel; an upper-vessel valve being provided at a predetermined position on said upper-vessel pipe or below said upper vessel for controlling downward flow of said cleaning solution from said upper vessel toward said cleaning vessel;

said cleaning vessel being located at a predetermined position at said middle level of said work platform, and being an enclosed vessel that can be sealed in a predetermined manner for treating a workpiece therein; inlet and outlet for said workpiece to be treated as well as other auxiliary tools and instruments being provided on said cleaning vessel depending on actual needs; an upper-flow control unit being provided at a predetermined position on the top of said cleaning vessel to communicate said cleaning vessel with said upper-vessel pipe; and a lower-flow control unit being provided at a predetermined position on the bottom of said cleaning vessel to communicate the same with a lower-vessel pipe, via which said cleaning solution flows from said cleaning vessel toward a lower vessel located at a predetermined position on said lower level of said work platform;

a lower-vessel valve that is provided on said lower-vessel pipe or said lower vessel at a position lower than a liquid surface in said lower vessel to control a downward flow of said cleaning solution from said cleaning vessel into said lower vessel;

said lower vessel being an enclosed vessel that can be sealed in a predetermined manner, having large volume and providing large cross-section area at the liquid surface therein, and being not fully filled with said cleaning solution; auxiliary tools and instruments may be provided on said lower vessel depending on actual needs; said lower-vessel pipe being connected at an end opposite to said lower-flow control unit to a predetermined position near a lower part of said lower vessel for said cleaning solution to flow from said cleaning vessel into said lower vessel; an exhaust valve being provided at a predetermined position near a top of said lower vessel that is not in contact with said cleaning solution for regulating an internal pressure of said lower vessel;

a pump pipe that is connected at a first end to a predetermined position at said lower part of said lower vessel and at a second end to a drawing pump; via said pump pipe, said drawing pump drawing said cleaning solution from said lower vessel into a rear treatment vessel having normal internal pressure or from said rear treatment vessel into said lower vessel, in order to regulate height of and pressure at said liquid surface in said lower vessel; and a pump valve that is provided at a predetermined position on said lower part of said lower vessel or said pump pipe to control a flow of said cleaning solution being drawn by said drawing pump to and from said lower vessel;

said upper-flow control unit being provided at a predetermined position on the top of said cleaning vessel to control flowing of said cleaning solution or gas into and out of said cleaning vessel; a plurality of control valves or functionally similar elements being selectively provided in said upper-flow control unit depending on actual need to control flowing of said cleaning solution or gas into and out of said cleaning vessel; alternatively, other elements being selectively provided to work with said auxiliary tools and instruments in said cleaning vessel; said control valves in said upper-flow control unit being connected to other devices, vacuum vessels, recovery containers having normal internal pressure, or to said upper-vessel pipe via a fixed or a detachable joint;

said lower-flow control unit being provided at a predetermined position on the bottom of said cleaning vessel to control flowing of said cleaning solution into and out of said cleaning vessel; a plurality of control valves or functionally similar elements being selectively provided in said lower-flow control unit depending on actual need to control flowing of said cleaning solution into and out of said cleaning vessel; alternatively, other elements being selectively provided to work with said auxiliary tools and instruments in said cleaning vessel; said control valves in said lower-flow control unit being connected to other devices, recovery containers having normal internal pressure, or to said lower-vessel pipe via a fixed or a detachable joint; and said exhausting pipe being connected at two ends to said upper vessel and said lower-flow control unit of said cleaning vessel for said cleaning solution in said upper vessel to upward flow into said cleaning vessel via the bottom thereof to exhaust gas existing in said cleaning vessel, and said exhausting pipe being provided depending on actual need.

* * * * *